US011258204B2

(12) United States Patent
Siev et al.

(10) Patent No.: US 11,258,204 B2
(45) Date of Patent: Feb. 22, 2022

(54) COMPENSATING CONNECTOR SYSTEM

(71) Applicant: BELDEN CANADA ULC, Saint-Laurent (CA)

(72) Inventors: Virak Siev, Montreal (CA); François Beauregard, La Prairie (CA); Michael Bodzay, Dollard-des-Ormeaux (CA); Luc Milette, Montreal (CA); Vincent Pilon, Montreal (CA); Jean-Sébastien Plamondon, Laval (CA)

(73) Assignee: BELDEN CANADA INC.

( * ) Notice: Subject to any disclaimer, the term of this patent is extended or adjusted under 35 U.S.C. 154(b) by 358 days.

(21) Appl. No.: 16/127,877

(22) Filed: Sep. 11, 2018

(65) Prior Publication Data

US 2019/0013623 A1 Jan. 10, 2019

Related U.S. Application Data

(63) Continuation of application No. 15/416,625, filed on Jan. 26, 2017, now Pat. No. 10,103,493.

(Continued)

(51) Int. Cl.

| | |
|---|---|
| ***B23P 19/00*** | (2006.01) |
| ***H01R 13/6463*** | (2011.01) |
| ***H01R 24/22*** | (2011.01) |
| ***H01R 24/30*** | (2011.01) |
| ***H01R 24/20*** | (2011.01) |
| ***H01R 24/28*** | (2011.01) |
| ***H01R 24/64*** | (2011.01) |

(Continued)

(52) U.S. Cl.

CPC ......... *H01R 13/6463* (2013.01); *H01R 24/20* (2013.01); *H01R 24/22* (2013.01); *H01R 24/28* (2013.01); *H01R 24/30* (2013.01); *H01R 24/64* (2013.01); *H01R 43/20* (2013.01); *H01R 2107/00* (2013.01); *Y10T 29/49208* (2015.01); *Y10T 29/5313* (2015.01)

(58) Field of Classification Search

CPC ......... H01B 11/04; H01B 11/06; H01B 11/08; Y10T 29/49117; Y10T 29/49208; Y10T 29/5313; Y10S 439/941; H01R 13/6463; H01R 24/64; H04B 3/32

USPC ......... 29/729, 428, 469, 745, 747, 748, 857, 29/874, 876, 881

See application file for complete search history.

(56) References Cited

U.S. PATENT DOCUMENTS

| | | | | |
|---|---|---|---|---|
| 6,371,793 B1 * | 4/2002 | Doorhy | H01R 13/6466 439/404 |
| 6,796,847 B2 * | 9/2004 | AbuGhazaleh | H05K 1/0228 439/676 |

(Continued)

OTHER PUBLICATIONS

International Search Report and Written Opinion of PCT/CA2017/050079, dated Apr. 4, 2017.

*Primary Examiner* — Thiem D Phan

(74) *Attorney, Agent, or Firm* — Lavery, De Billy, LLP; Hugh Mansfield

(57) ABSTRACT

A connector and assembly of a cabling category and comprising two mating zones connected by an intermediate zone. Each of the zones is manufactured such that Near End Cross Talk (NEXT) resulting from transmission of the high frequency signal across each zone is below a specified amount chosen such that NEXT introduced by a high frequency signal transmission between via all the zones is below a level as specified for the cabling category.

10 Claims, 23 Drawing Sheets

Related U.S. Application Data

(60) Provisional application No. 62/287,205, filed on Jan. 26, 2016.

(51) Int. Cl.
*H01R 43/20* (2006.01)
*H01R 107/00* (2006.01)

(56) References Cited

U.S. PATENT DOCUMENTS

| | | | |
|---|---|---|---|
| 7,837,513 | B2 | 11/2010 | Milette et al. |
| 7,874,878 | B2 | 1/2011 | Fite et al. |
| 7,905,753 | B2 | 3/2011 | Siev et al. |
| 8,011,972 | B2 | 9/2011 | Caveney et al. |

* cited by examiner

COMPENSATING CONNECTOR SYSTEM

FIELD OF THE INVENTION

The present invention relates to a compensating connector system. In particular, the present application relates to plug and receptacles for terminating copper cables and the like.

BACKGROUND TO THE INVENTION

The prior art discloses assemblies and methods for terminating cables which compensate for Near End Cross Talk (NEXT) introduced by their interconnection with other devices, cables and the like. These assemblies compensate for NEXT using coupling networks. One drawback of these prior art assemblies is that their interconnection is not independently compensated for NEXT introduced at a number of different locations.

SUMMARY OF THE INVENTION

In order to address the above and other drawbacks, there is provided a compensating receptacle connector for terminating a cable comprising four twisted pairs of conductors and for connecting with a plug, the cable of a cabling category. The connector comprises a plug mating zone comprising an RJ-45 compatible receptacle, an elongate flexible printed circuit board (PCB), eight like elongate contacting surfaces arranged in parallel and side by side towards a first end of the PCB, each of the contacting surfaces comprising a trace on the PCB, each of the contacting surfaces adjacent and equidistant from at least one other adjacent contacting surface, and an elongate slot between adjacent ones of the contacting surfaces, wherein the contacting surfaces each comprise a contact point at an end thereof, wherein when said receptacle is connected with the plug, Near End Cross Talk (NEXT) resulting from transmission of the high frequency signal across the plug mating zone is below a specified amount, a cable mating zone comprising four pairs of conductor termination points towards a second end of the PCB, each of the twisted pairs of conductors terminated at a respective pair of the termination points wherein NEXT resulting from transmission of the high frequency signal across the cable mating zone is below a specified amount, and an intermediate zone comprising a plurality of connecting traces on the PCB, one of the connecting traces interconnecting each of the conductor termination points with the contact point of a respective contacting surface wherein NEXT resulting from transmission of the high frequency signal across the intermediate mating zone is below a specified amount wherein the specified amount is below a level as specified for the cabling category and the NEXT resulting from transmission of the high frequency signal between the cable and the device is below a level as specified for the cabling category.

Additionally, there is provided a compensating plug connector for terminating a cable comprising four twisted pairs of conductors and for connecting with a receptacle, the cable of a cabling category. The connector comprises an RJ-45 compatible plug, a receptacle mating zone comprising an elongate flexible printed circuit board (PCB), eight like elongate terminal contacts arranged in parallel and side by side towards a first end of the PCB and exposed along a front face of the plug, each of the terminal contacts comprising a trace on the printed circuit board, each of the terminal contacts adjacent and equidistant from at least one other adjacent terminal contact, wherein Near End Cross Talk (NEXT) resulting from transmission of the high frequency signal across the receptacle mating zone is below a specified amount, a cable mating zone comprising four pairs of conductor termination points towards a second end of the PCB, each of the twisted pairs of conductors terminated at a respective pair of the termination points wherein NEXT resulting from transmission of the high frequency signal across the cable mating zone is below a specified amount, and an intermediate zone comprising a plurality of connecting traces on the flexible PCB, one of the connecting traces interconnecting each of the conductor termination points with the contact point of a respective contacting surface wherein NEXT resulting from transmission of the high frequency signal across the intermediate mating zone is below a specified amount, wherein the specified amount is below a level as specified for the cabling category and the NEXT resulting from transmission of the high frequency signal between the cable and the device is below a level as specified for the cabling category.

Also, there is provided an assembly for interconnecting a first cable comprising a first plurality of twisted pairs of conductors with a second cable comprising a second plurality of twisted pairs of conductors, each of the cables of a cabling category. The assembly comprises a first mating zone comprising a first plurality of pairs of contacts, each of the first pairs of contacts configured for connection with a respective pair of the first plurality of twisted pairs of conductors, a second mating zone comprising a second plurality of pairs of contacts, each of the second pairs of contacts configured for connection with a respective pair of the second plurality of twisted pairs of conductors, and an intermediate transmission zone interconnecting each contact of the first pairs of contacts with a respective one of the second pairs of contacts, wherein each of the first mating zone, second mating zone and the intermediate zone comprises an independent coupling network and such that near end cross talk introduced by a high frequency signal transmission between the first cable and the second cable in any of the segments is below a level as specified for the cabling category and the NEXT resulting from transmission of the high frequency signal between the first cable and the second cable is below a level as specified for the cabling category.

DETAILED DESCRIPTION OF THE ILLUSTRATIVE EMBODIMENTS

Figure 1A:
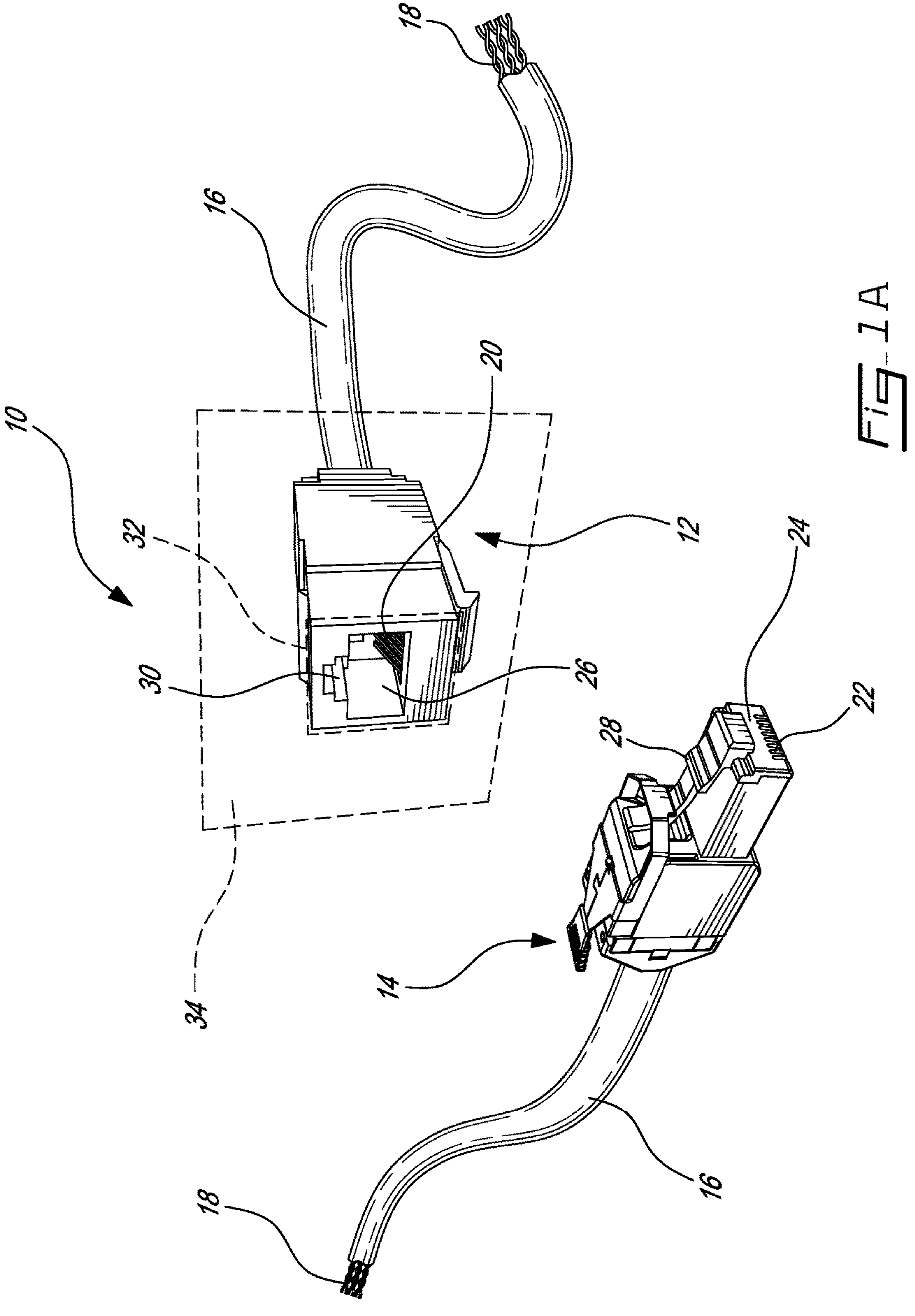
FIG. 1A is a schematic view of a receptacle and plug in accordance with an illustrative embodiment of the present invention.

Referring now to FIG. 1A, a compensating connector system, generally referred to using the reference numeral 10, will now be described. The connector system comprises a receptacle 12 and a plug 14 each terminating a cable 16 illustratively comprising a plurality of twisted pairs of conductors 18. The conductors 18 are each terminated by a respective one of a plurality of tines 20 in the case of a cable 16 terminated by a receptacle 12 or terminal contacts 22 in the case of a cable 16 terminated by a plug 14. A front end 24 of the plug 14 is configured for engagement within a socket 26 formed in the front of the receptacle 12 and is released held therein through provision of a locking latch 28 on the plug 14 which releasably engages a recess 30 in the socket. Illustratively, the front of the receptacle 12 conforms to that of a keystone type receptacle and is illustratively configured to be accepted into a standardised aperture 32 in a wall plate 34, patch panel (not shown), or the like.

Figure 1B:
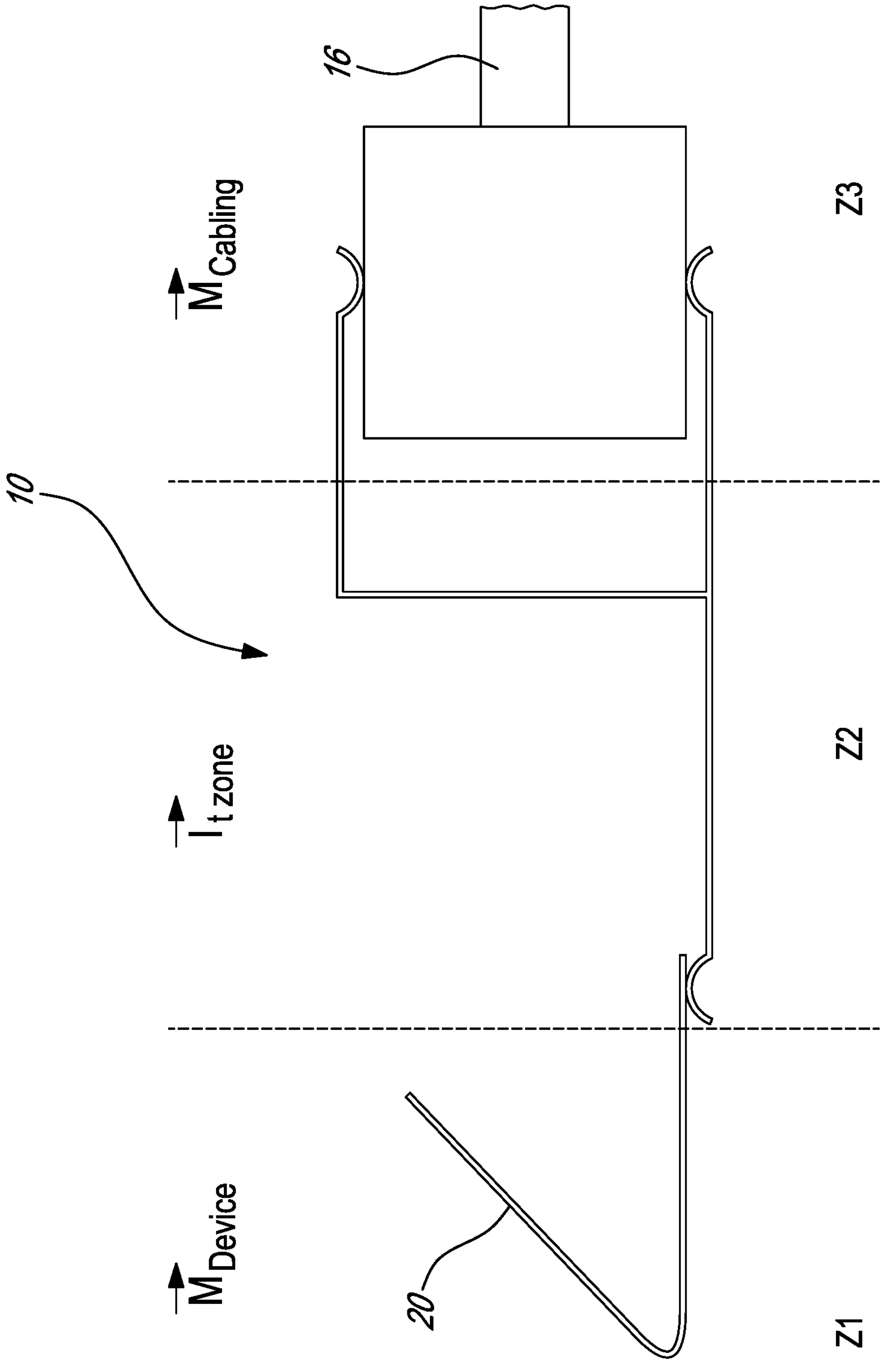
FIG. 1B provides a schematic diagram of a manufacturing method and assembly in accordance with an illustrative of the present invention.

Referring now to FIG. 1B in addition to 1A, the compensating connector system 10 is divided into three (3) zones, a device mating zone Z1/$M_{device}$, and intermediate transmission zone Z2/$I_{tzone}$ and a cabling mating zone Z3/$M_{cabling}$. Illustratively in FIG. 1B, $M_{device}$ is shown as a receptacle 12 comprising plurality of tines 20 for receiving a plug 14 and $M_{cabling}$ is shown as an assembly for terminating a cable 16. $I_{tzone}$ is illustratively shown as a structure, examples of which are described in more detail below, for interconnecting each of the conductors of the cable 16 with a respective one of the tines 20. For a given cabling category each of the zones Z1, Z2 and Z3 are designed such that that Near End Cross Talk (NEXT) resulting from transmission of the high frequency signal across the zone is below a specified amount as specified for the cabling category. An example of a cabling category is one conforming to the cabling standard TIA-568-C.2. Additionally, each of the zones Z1, Z2 and Z3 are designed such that the NEXT resulting from transmission of the high frequency signal via all three zones, for example between the cable and the device, is below a level as specified in the cabling standard.

Figure 2C:
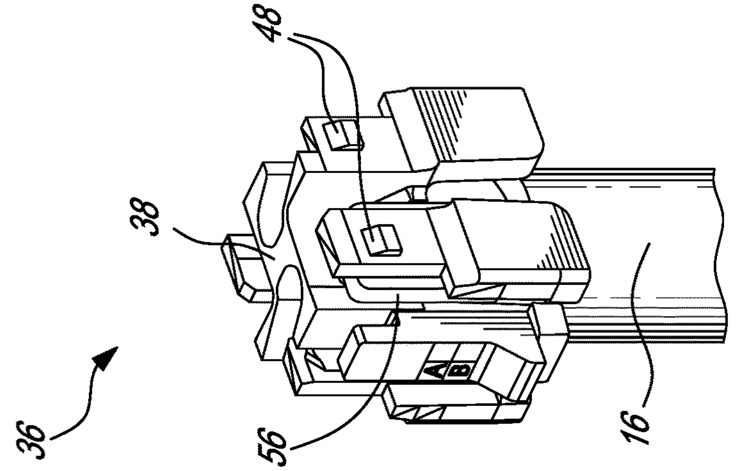
FIGS. 2A through 2D provide Isometric views of a core assembly comprising a wire guide and detailing the installation of a cable in accordance with an illustrative embodiment of the present invention.
Figure 2B:
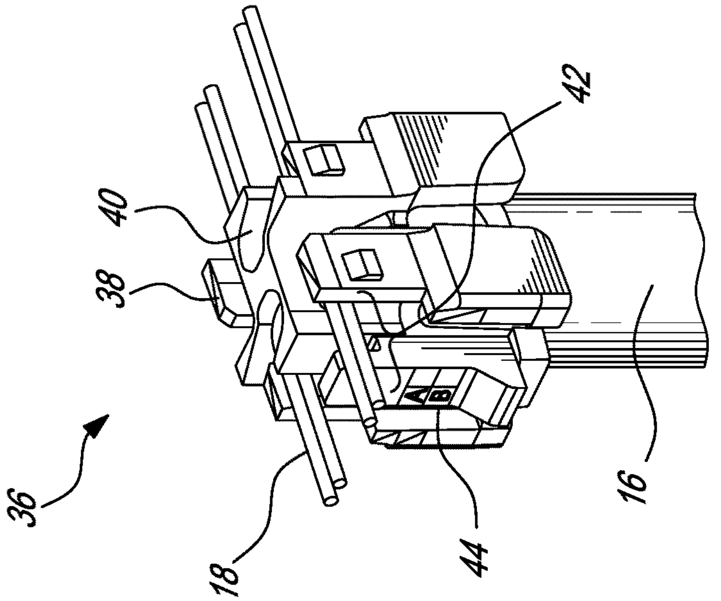
Figure 2A:
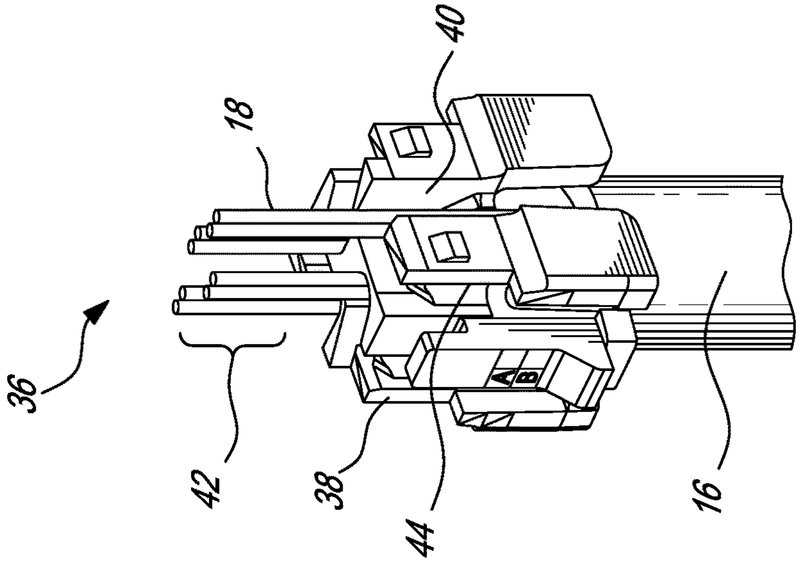
Figure 2D:
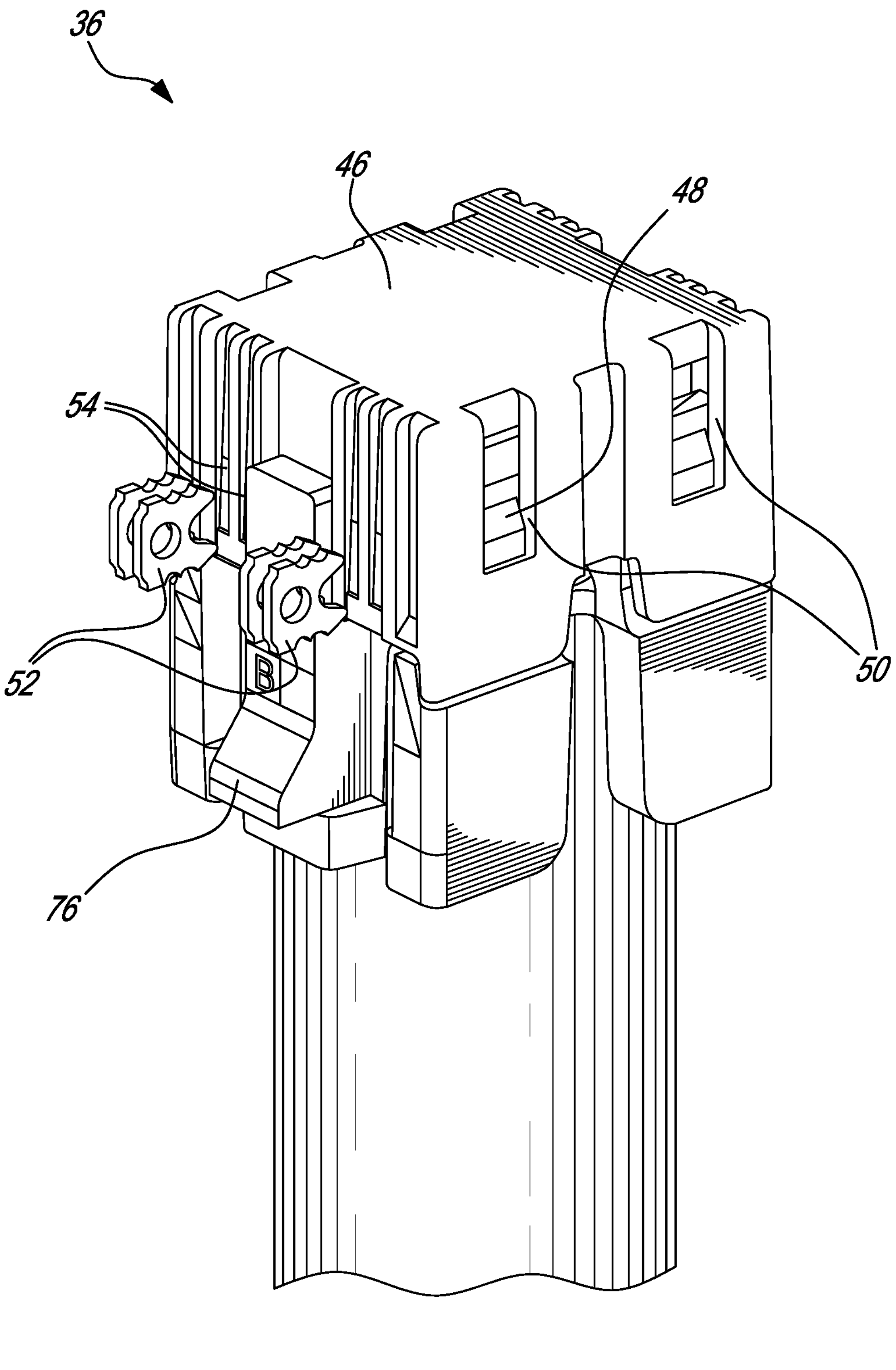

Referring now to FIGS. 2A through 2C, in an embodiment of the cable mating zone, the conductors 18 of the cables are initially terminated by a core assembly 36 comprising a wire guide 38 by feeding the respective (twisted) pairs of conductors 18 into predefined openings 40, untwisting an end portion 42 of the conductor then placing the pairs of conductors into respective slots 44 in the wire guide 38. Referring to FIG. 2D in addition to FIG. 2C, a cap 46 is then placed over the wire guide 38/cable 16 and secured by insuring that a plurality of tabs 48 on the wire guide 38 engage with respective openings 50 in the cap 46. To complete the core assembly 36, piercing contacts 52 are inserted into slots 54 in the cap 46. When the cap 46 is secured on the wire guide 36/cable 16, the slots 54 align with respective ones of the conductors 18 and such that insertion of the piercing contacts 52 into their respective slots 54 results in the piercing contacts 52 each piercing the insulating jacket 56 surrounding their respective conductors 18 and such that the piercing contacts 52 come into contact with the conductive core.

Figure 3:
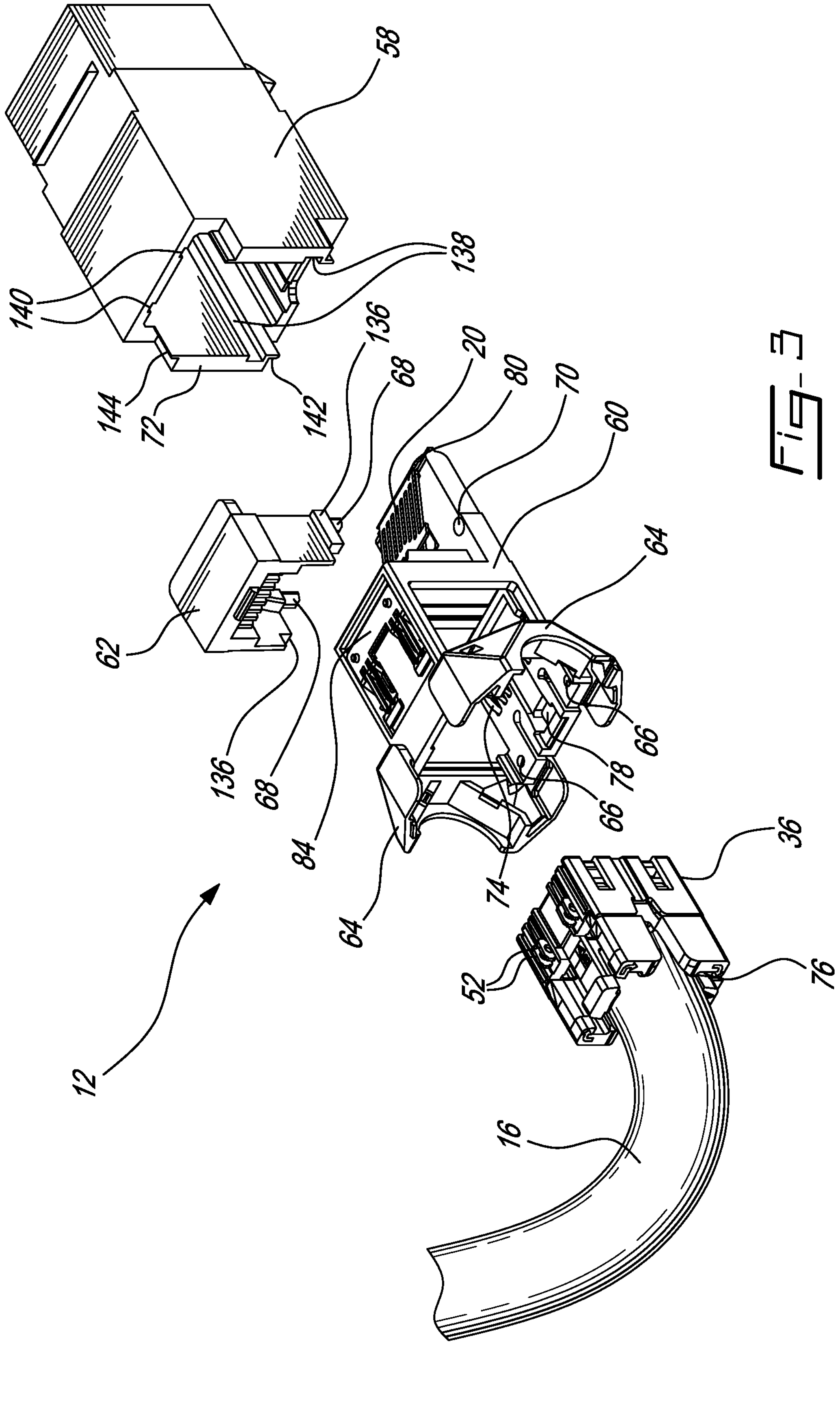
FIG. 3 is an exploded isometric view of a receptacle and in accordance with an illustrative embodiment of the present invention.

Referring now to FIG. 3, in a first embodiment the receptacle 12 comprises a housing 58 which receives an interconnection assembly 60 comprising the tines 20 interconnected via a printed circuit board, as well as a stabilising insert 62. A pair of doors 64 which are hinged about pivot points 66 on the interconnection assembly 60. The receptacle 12 is assembled by placing the stabilising insert 62 over the tines 20 and inserting a pair of pins 68 in holes 70 in the interconnection assembly 60 and then inserting the interconnection assembly 60/stabilising insert 62 into the housing 58 via its rearward face 72.

Still referring to FIG. 3, once assembled, the receptacle 12 is suitable for receiving, via its rear ward face 72, a core assembly 36 as discussed above. In this regard interconnection assembly 60 comprises a plurality of contact surfaces 74, each one of which is connected with a respective one of the tines 20. With reference back to FIG. 2D in addition to FIG. 3, on complete insertion of the core assembly 36 into the receptacle 12, each one of the contact surfaces 74 comes into contact with a respective one of the piercing contacts 52 thereby interconnecting each of the tines with a respective one of the conductors 18. On complete insertion into the receptacle 12, a raised boss 76 on the wire guide engages a flexible locking slot 78 in the interconnection assembly 60, thereby retaining the core assembly 36 within the receptacle 12. The doors 64 can then be pivoted about their hinges 66 until closed to complete the assembly.

Figure 4A:
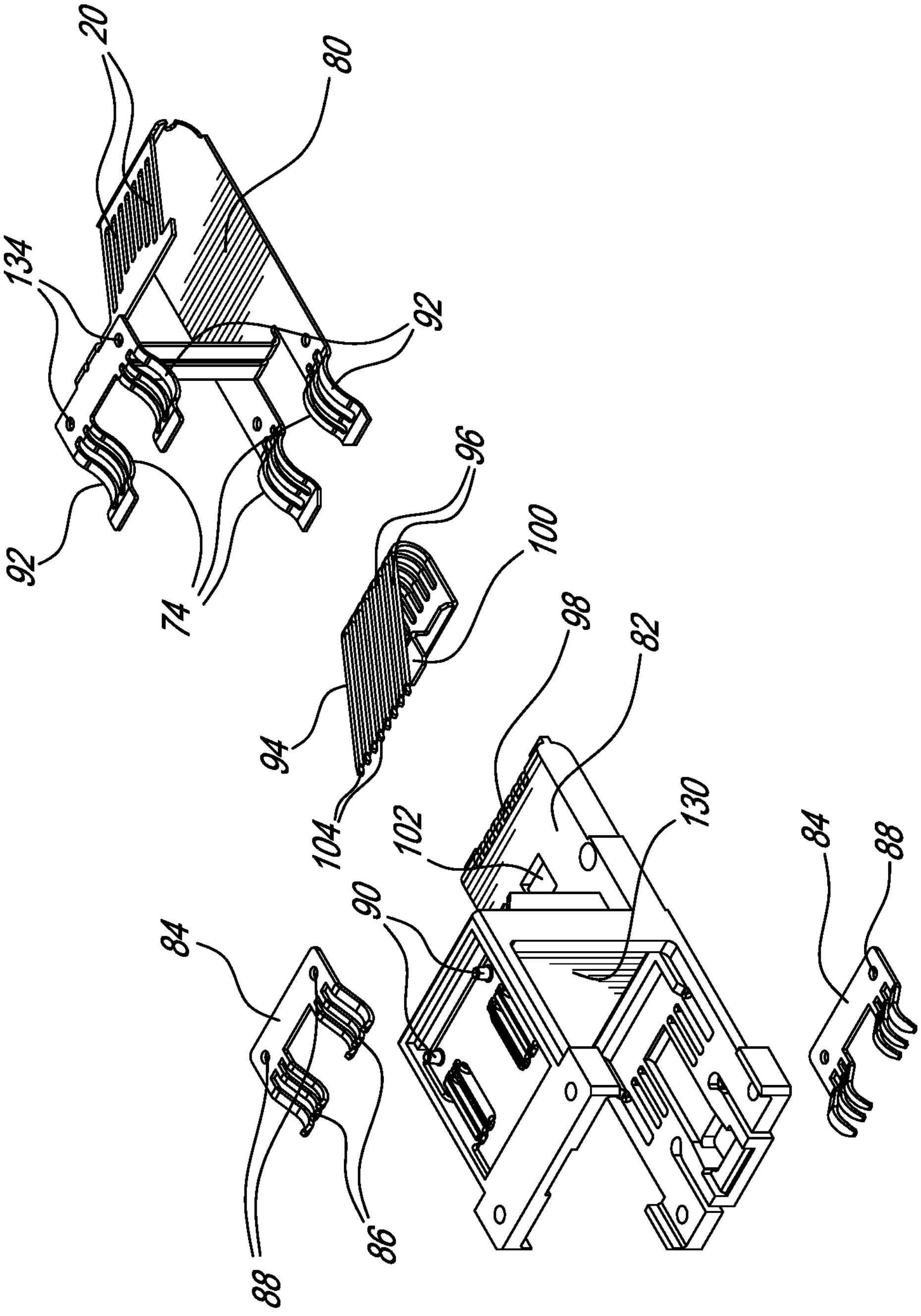
FIG. 4A is detailed exploded isometric view of a receptacle interconnection assembly and in accordance with an illustrative embodiment of the present invention.
Figure 4B:
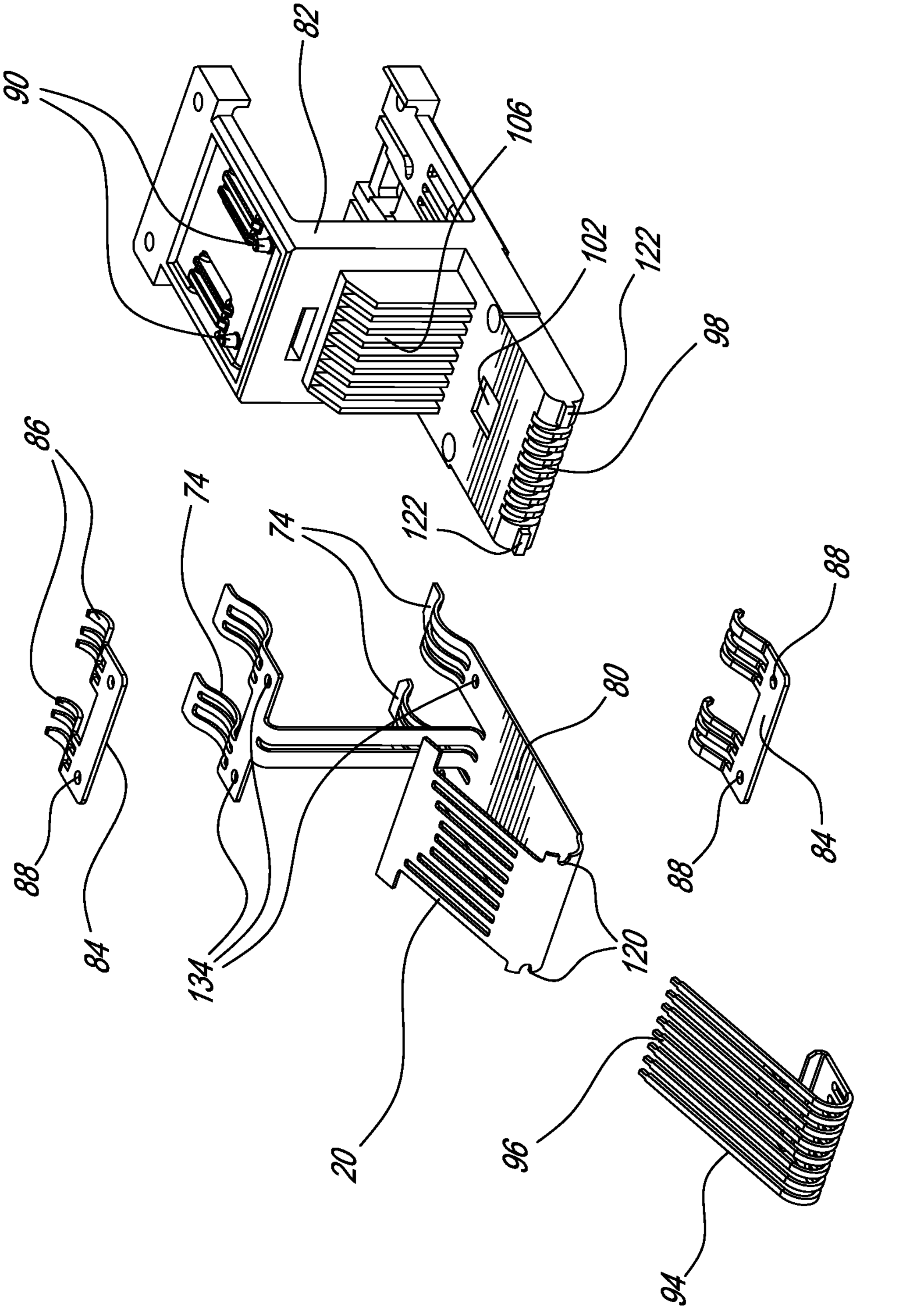
FIG. 4B is left front perspective view of a receptacle interconnection assembly and in accordance with an illustrative embodiment of the present invention.

Referring to FIGS. 4A and 4B in addition to FIG. 3, as will be discussed in more detail below, in a first embodiment the tines 20 and contact surfaces 74, as well as the transmission lines and other electronic elements (both not shown) that interconnect each tine 20 with its respective contact surface 74 is provided via electrical traces (not shown) etched or otherwise formed on the surface of a flexible printed circuit board (PCB) 80 mounted to a support structure 82. In order to ensure good contact, a flexible biasing plate 84 is provided for biasing each of the contact surfaces 74 towards their respective piercing contacts 52. In this regard, each of the biasing plates 84 comprises a plurality of flexed fingers 86 which are bent to provide a suitable shape to the surface of the flexible PCB 80 in the region of the contact surfaces 74. During assembly a pair of holes 88 in each biasing plate 84 are engaged by a complementary pair of pins 90 moulded or otherwise formed in the support structure 82.

Still referring to FIGS. 4A and 4B, an additional set of contact surfaces 92 are provided for improving mechanical strength when the core assembly 36 is inserted or removed. Also, the additional set of contact surfaces 92 can be used to provide other features, such as an electrical path for a ground or the like. A comb-like tine support 94, for example manufacture from a rigid yet flexible material such as steel or plastic or the like, and comprising a plurality of elongate flexible members 96 for supporting a respective one of the tines 20 is provided to support the underside of the flexible PCB 80 in the region of the tines 20 and such that they are biased, with reference to FIG. 1, towards the terminal contacts 22 of a plug 14 inserted into the receptacle 12. The tine support 94 is secured to a profiled end 98 of the support structure 82 via tab 100 which engage a slot 102 in the support structure 82. The ends 104 of the elongate flexible members 96 are retained in a series of vertical slots 106 which limits their travel laterally but allows for free movement of each elongate flexible member 96 along the length of its respective slot 106.

Figure 5A:
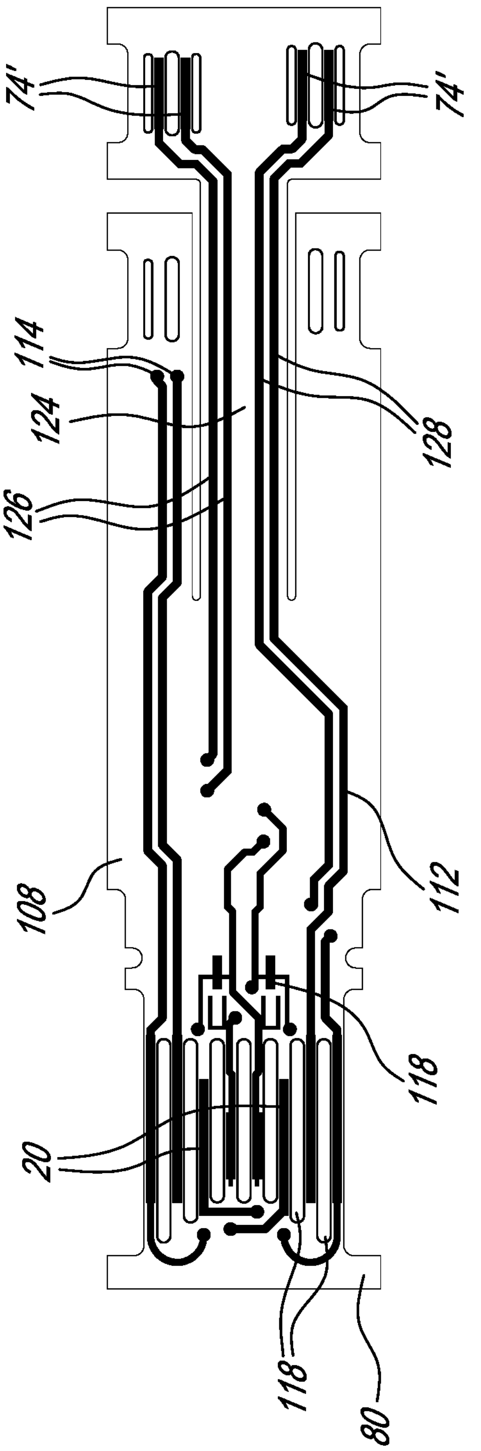
FIGS. 5A and 5B provide respectively top and bottom views of a flexible PCB artwork for a receptacle and in accordance with an illustrative embodiment of the present invention.
Figure 5B:
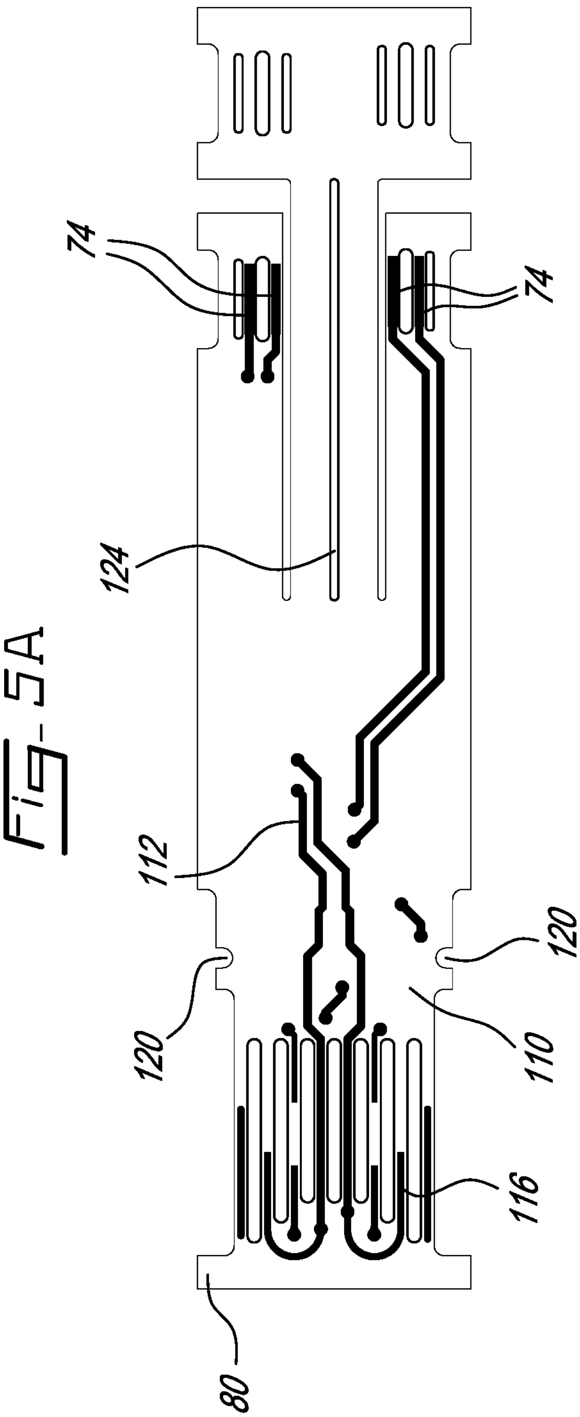

Referring now to FIGS. 5A and 5B, in a first embodiment, and as discussed above, the flexible PCB 80 comprises a pair of opposed sides 108, 110 (top and bottom) of a single piece of dielectric material onto which a plurality of conductive traces 112 are etched or otherwise formed. The traces 112 interconnect each of the tines 20 with respective ones of their contact surfaces 74. Vias 114 are provided to allow traces 112 on a first side of the flexible PCB 80 to be interconnected with traces on the opposite side. In the device mating zone, additional traces 116 can be provided to create regions of capacitive and/or inductive coupling, and in order to provide compensation networks to address crosstalk and the like. Alternatively, discrete components such as capacitors and inductors (not shown) can be attached to the surface of the flexible PCB 80, for example through the use of solder or the like. The tines 20 and the contact surfaces 74 are typically plated with a durable non-oxidizing conductive material such as gold (not shown) in order to improve signal transmission. A plurality of slots 118 are provided between each of the tines 20 such that the tines 20 may flex independently.

Referring back to FIGS. 4A and 4B in addition to FIGS. 5A and 5B, the flexible PCB 80 further comprises a pair of opposed cut outs 120 which engage complementary pins 122 on the profiled end 98 of the support structure 82. Additionally, in a particular embodiment an elongate slot 124 is provided between the pairs of traces/transmission lines 126, 128 in the intermediate zone which interconnect the upper pair of contact surfaces 74' with their respective tines 20. This allows, for example, the traces/transmission lines 126, 128 to be deflected from one another, for example by profiling the rearward surface 130 of the support structure 82 against which they lie, which in some cases may improve the balancing of the traces/transmission lines 126, 128 and the overall performance of the assembly.

Figure 6A:
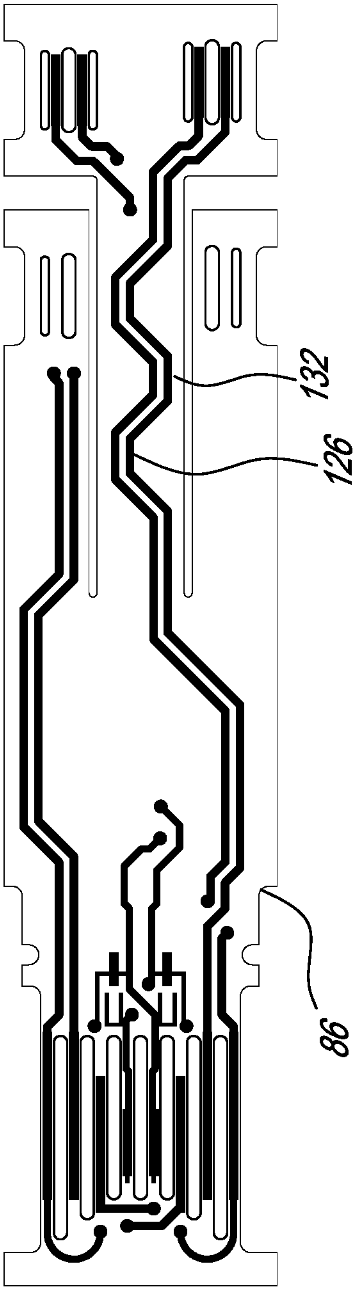
FIGS. 6A and 6B provide respectively top and bottom views of a flexible PCB artwork for a receptacle and in accordance with a second illustrative embodiment of the present invention.
Figure 6B:
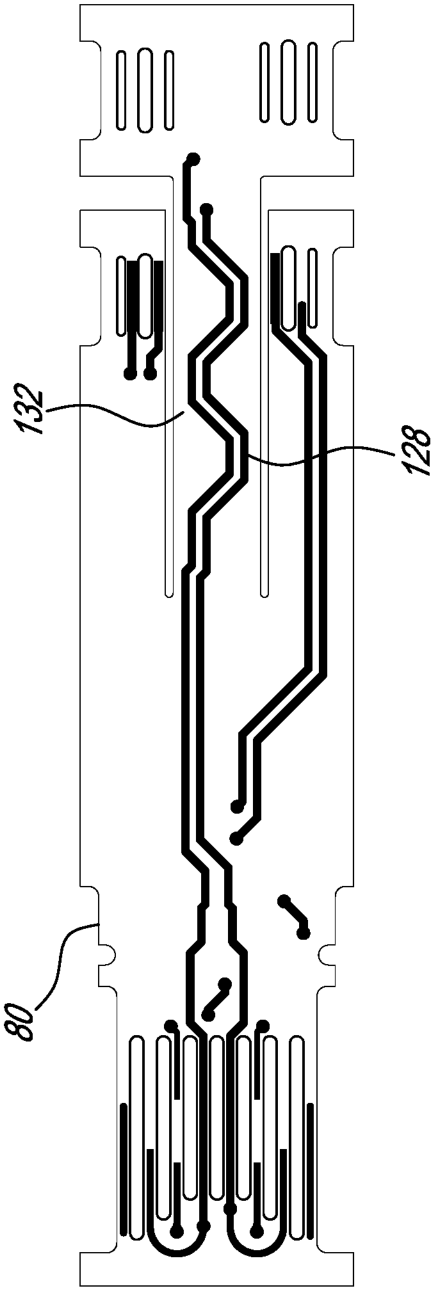

Referring now to FIGS. 6A and 6B, in a second embodiment of the flexible PCB 80, the traces/transmission lines 126, 128 located in an intermediate section 132 of the flexible PCB 80 on opposite sides thereof cross one another to balance the transmission paths.

Referring again back to FIGS. 4A and 4B, in a particular embodiment a series of holes 134 can be provided in the flexible PCB 80 in the region of the contact surfaces 74 which are also engaged by the pins 90 on assembly, thereby securing the flexible PCB 80 in this region between the biasing plates 84 and the support structure 82.

Figure 7B:
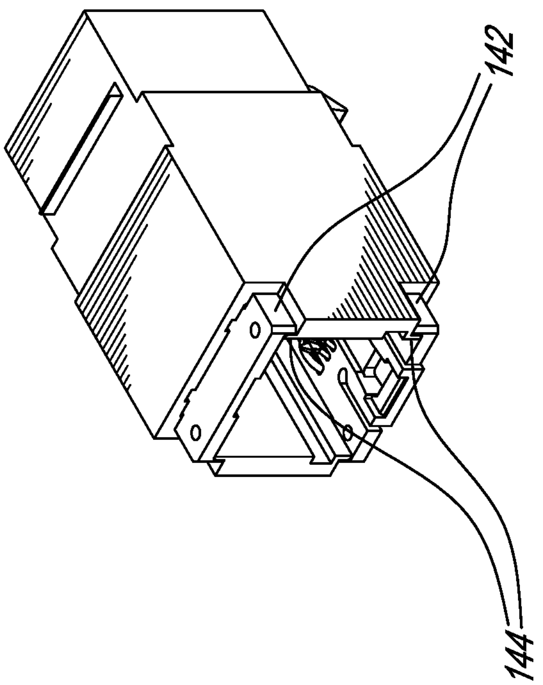
FIGS. 7A and 7B provide isometric views of a receptacle interconnection assembly being inserted into a housing and in accordance with an illustrative embodiment of the present invention.
Figure 7A:
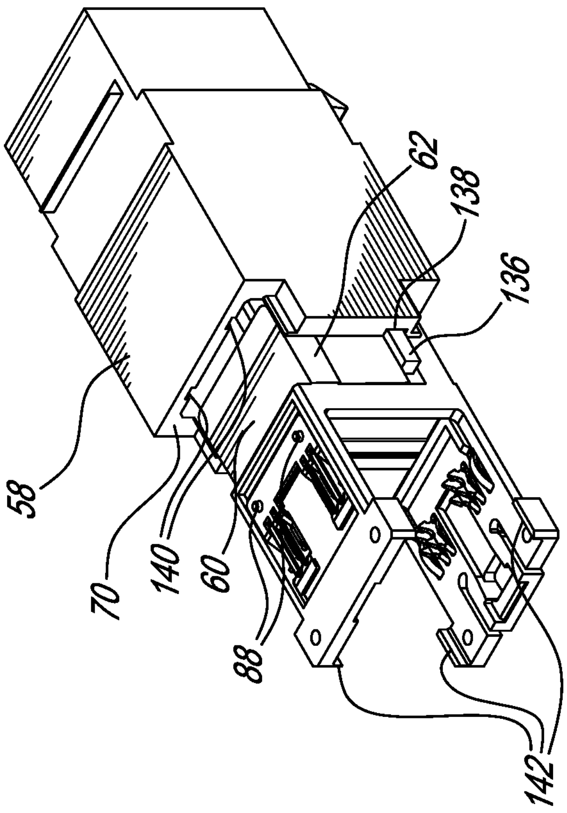

Referring now to FIG. 7A in addition FIG. 3, during assembly, as the interconnection assembly 60 is inserted into the rearward face 72 of the housing 58, a pair of rails 136 on the sides of the stabilising insert 62 engage a pair of opposed channels 138 in the inner sides of the housing 58. A second pair of channels 140 is provided on the top (shown) and bottom (not shown) of the rearward face 72 to provide clearance for the pins 90 which might otherwise be engaged by the rearward face 72 as the interconnection assembly 60 is inserted into the rearward face 72. Referring now to FIG. 7B in addition to FIG. 3, as the interconnection assembly 60 is inserted completely into the rearward face 72 flanges 142 on the interconnection assembly 62 engage complementary skids 144 moulded in the rearward face 72 of the housing 60 in a friction fit thereby further stabilising the assembly.

Figure 8:
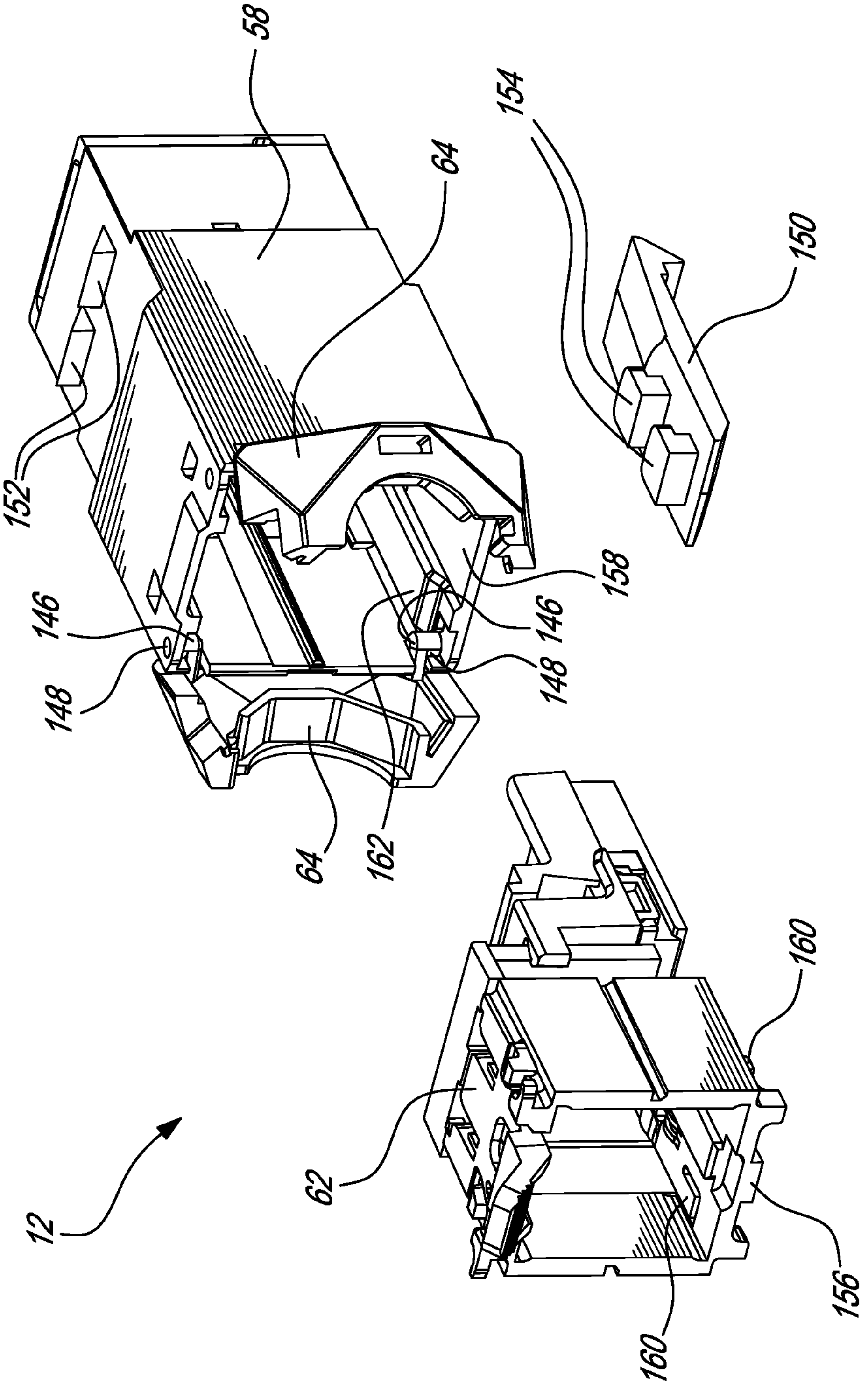
FIG. 8 provides an exploded isometric view of a receptacle and in accordance with an alternative illustrative embodiment of the present invention.

Referring now to FIG. 8, in an alternative embodiment of the receptacle 12, each of the hinged doors 64 are secured directly to the housing 58 via a pair of pivot arms 146 which engage opposed mounting holes 148 moulded in the housing 58. Additionally, the flexible hook 150 which, together with raised bosses 152 on an opposing side of the housing 58 is used to releasably secure the receptacle 12 in a patch panel or the like (not shown) is attached to the housing 58 via a pair of brackets 154 which engage complementary recesses (not shown) moulded in the housing 58.

Still referring now to FIG. 8, on insertion the interconnection assembly 60 is engaged snuggly by the housing 58. As the interconnection assembly 60 is inserted into the housing 58, a raised skid 156 engages a complementary channel 158 within the housing 58. Once the interconnection assembly 60 is fully inserted into the housing 58, a pair of flexible tabs 160 engage complementary recesses 162 in the housing thereby securing the interconnection assembly 60 within the housing 58.

Figure 9A:
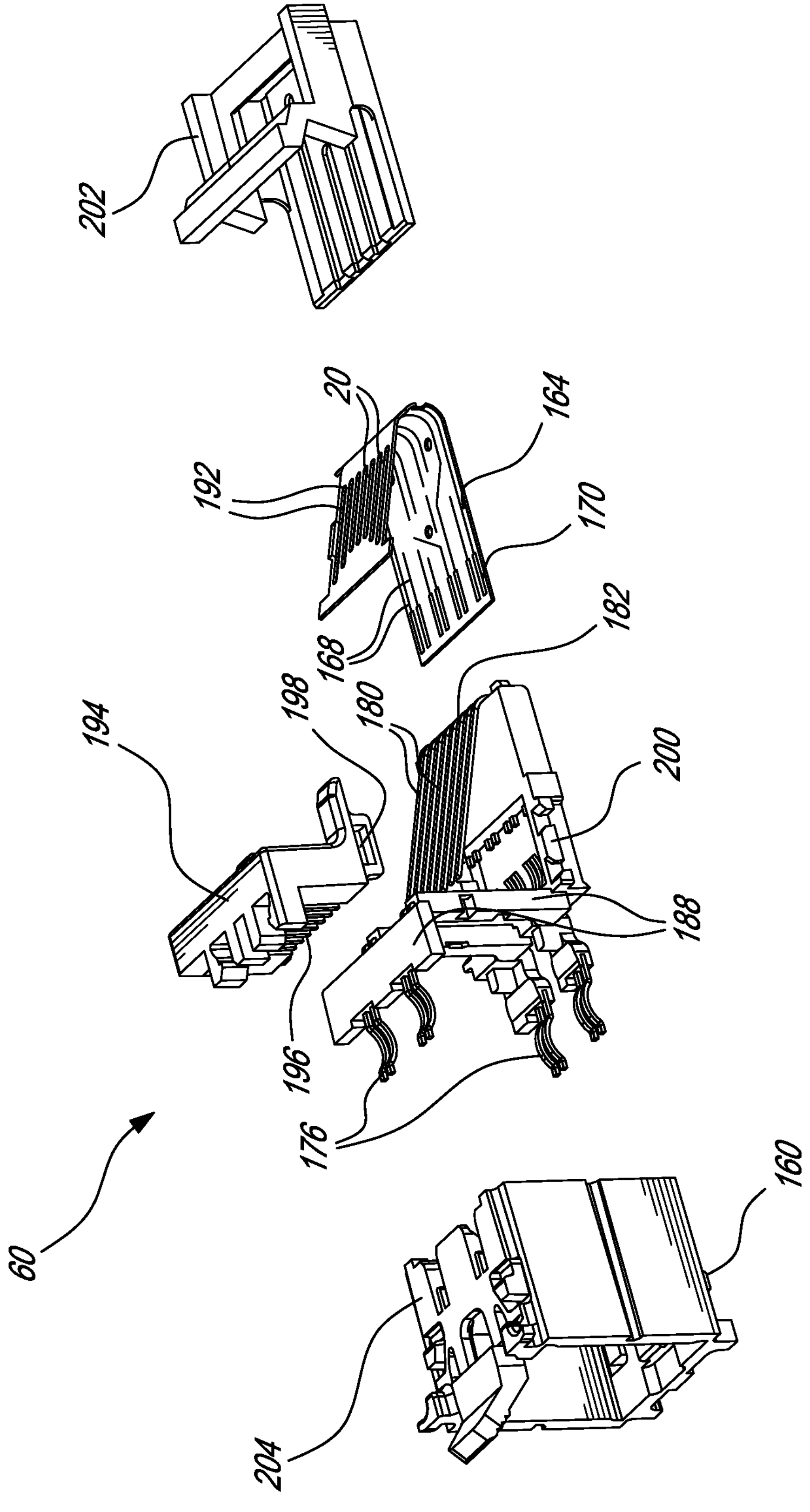
FIG. 9A provides a raised left rear perspective view of a receptacle and in accordance with an alternative illustrative embodiment of the present invention.
Figure 9B:
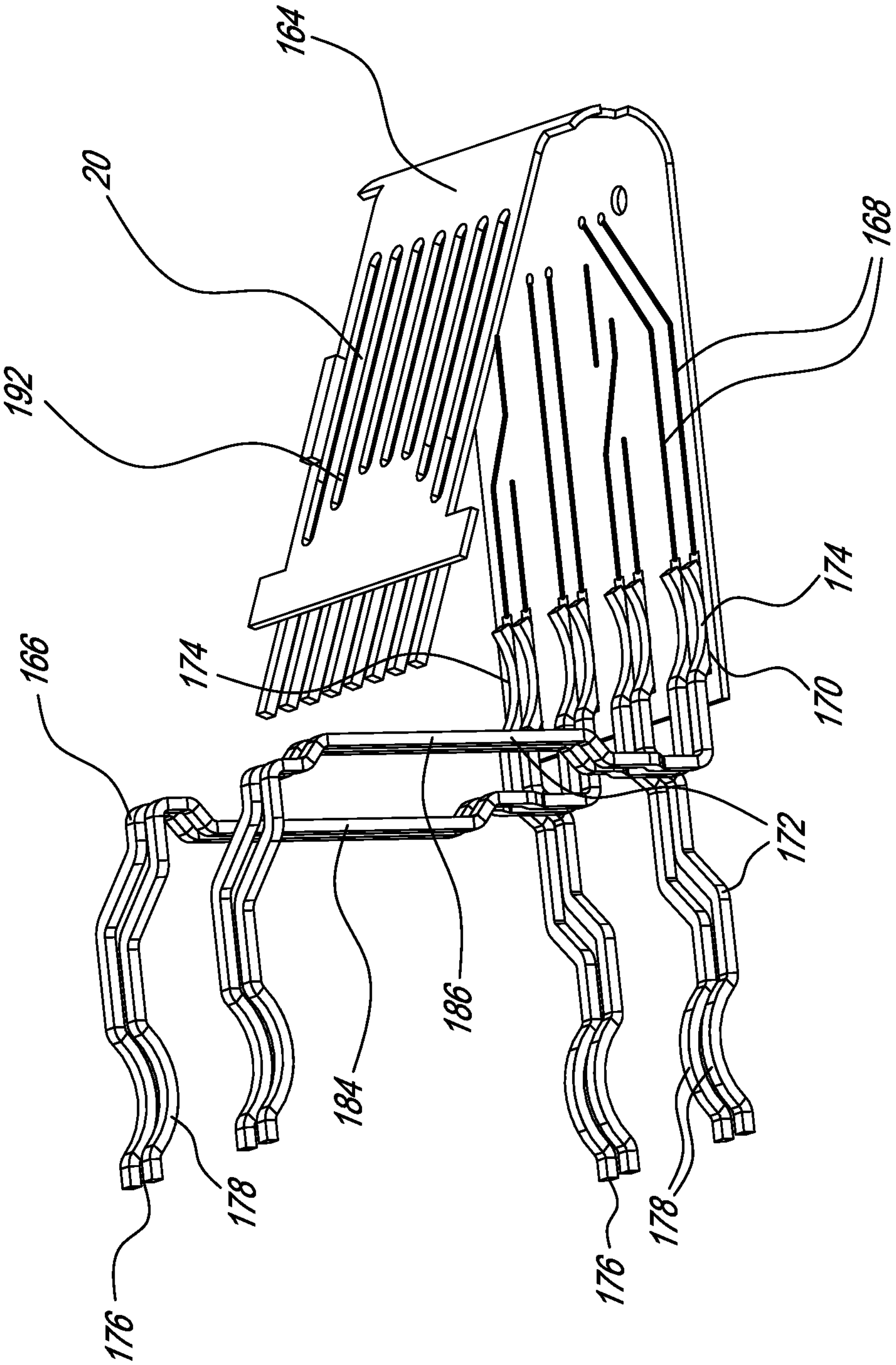
FIG. 9B provides a raised side perspective view of the flexible PCB and lead frame of FIG. 9A.

Referring now to FIGS. 9A and 9B in addition to FIG. 8, in the alternative embodiment of the receptacle 12, the interconnection assembly 60 is comprised of a flexible PCB 164 where the intermediate zone comprises a lead frame 166. The device mating zone comprises a flexible PCB 164 comprising a plurality of tines 20 as well as traces 168 which interconnect each of the tines 20 with respective ones of a plurality of contact pads 170 on the surface of the PCB. The lead frame 166 is comprised of a plurality of rigid yet flexible metal bars 172 which provide the transmission paths between each of the contact pads 170, which are in contact with a first end 174 of a respective flexible metal bar 172, and respective second ends 176. Each of the second ends 176 comprises a convex contact surface 178 which engages with a respective one of the piercing contacts 52 when the core assembly 36 is inserted into the receptacle 12.

Figure 10C:
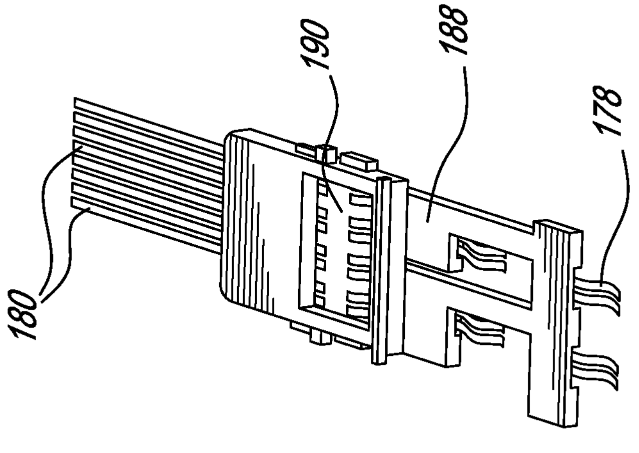
FIGS. 10A through 10C detail manufacturing steps for a lead frame and in accordance with an alternative illustrative embodiment of the present invention.
Figure 10B:
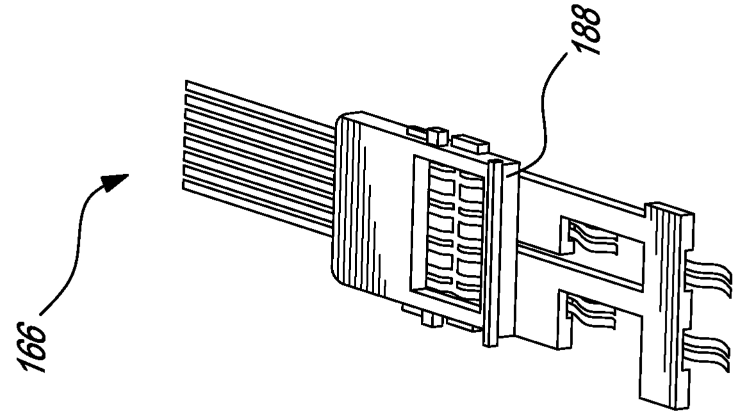
Figure 10A:
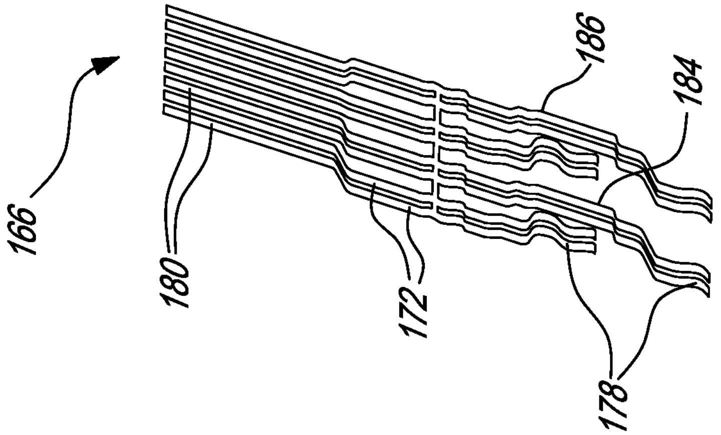

Referring now to FIG. 10A in addition to FIG. 9B, the flexible metal bars 172 which make up the lead frame 166 as well as the elements 180 of the comb-like support 182 are illustratively manufactured from a single piece of metallic material, for example by stamping or the like. During stamping the flexible metal bars 172 can be formed to include sections of different heights, for example to provide convex contact surfaces 178 or to provide staggered regions 184, 186 to better manage mutual interference and the like. Referring to FIG. 10B, in a subsequent step, the metal bars 172 are overmoulded with a plurality of plastic stabilising members 188 following which, and with reference to FIG. 10C, the elements 180 of the comb-like support 182 are electrically separated from the flexible metal bars 172 by removing a connecting portion 190 of metal.

Referring back to FIG. 9A, the assembly comprising the metal bars 172, the elements 180 of the comb-like support 182 and the plastic stabilising members 190 is then bent or otherwise formed into its final shape. The flexible PCB 164 can then be combined with the assembly. In this regard, each element 180 of the comb-like support 182 supports a respective one of the tines 20. A series of slots 192 are provided within the flexible PCB 164 between adjacent ones of the tines 20 and such that the tines 20 may flex substantially independently together with their respective supporting element 180. In order to ensure that the spacing between each element 180 of the comb-like support 182, the comb-like support 182 is preassembled with a retainer 194 and such that each of the elements 180 rests in a respective slot 196 of the retainer 194. The retainer 194 is held in place by slots 198 which engage with respective bosses 200 moulded or otherwise formed in the plastic stabilising members 190. An additional stabilising element 202 is placed over the front end of the PCB 164 and the comb-like support 182 support to further stabilise the assembly. A wire guide receiving receptacle 204 is also provided. Referring back to FIG. 8 in addition to FIG. 9A, as discussed above during assembly as the wire guide receiving receptacle 204 is inserted into the housing 58, a pair of flexible tabs 160 engage complementary recesses 162 in the housing 58 thereby securing the assembly within the housing 58.

Figure 11A:
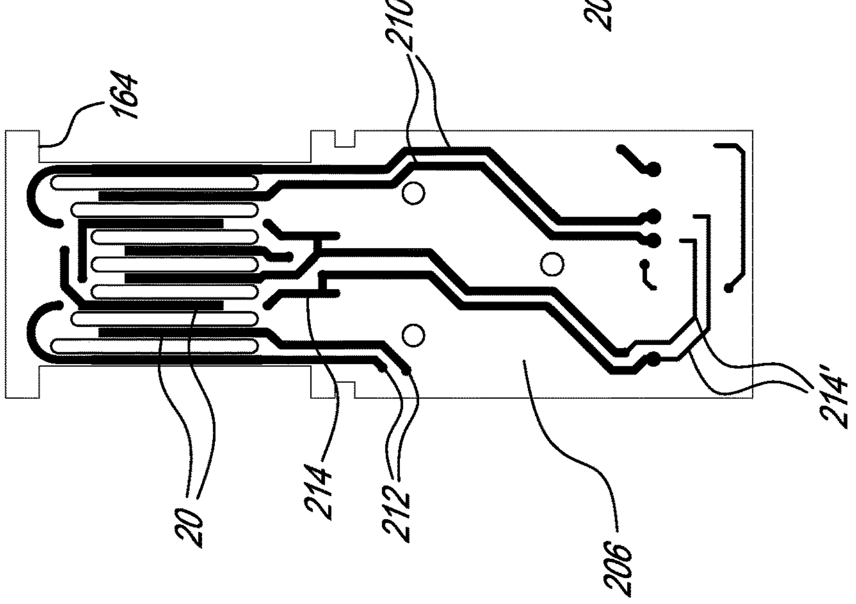
FIGS. 11A and 11B provide respectively top and bottom plan views of flexible PCB artwork for a receptacle and in accordance with a second alternative illustrative embodiment of the present invention.
Figure 11B:
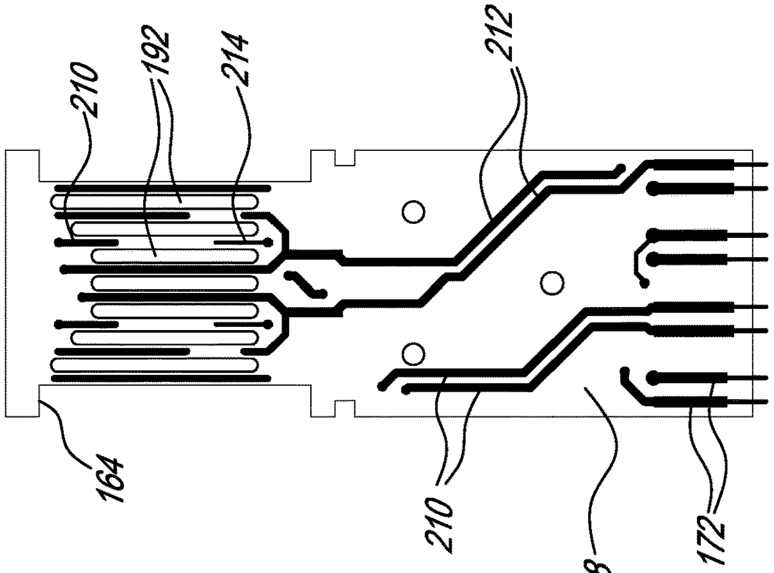
Figure 11C:
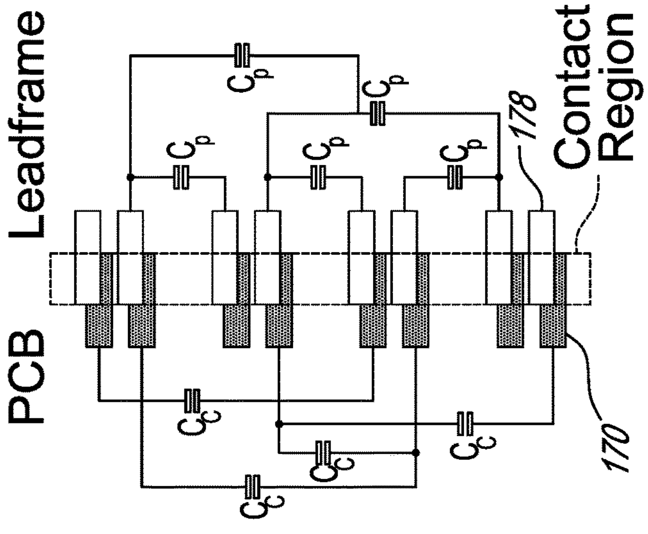
FIG. 11C provides a schematic diagram of a compensation scheme in accordance with an illustrative embodiment of the present invention.

Referring now to FIGS. 11A and 11B, in an alternative embodiment, and as discussed above, the device mating zone comprises a flexible PCB 164 comprised of a pair of opposed sides 206, 208 (top and bottom) of a single piece of dielectric material onto which a plurality of conductive traces 210 are etched or otherwise formed. The traces 210 interconnect each of the tines 20 with respective ones of their contact pads 170. Vias 212 are provided to allow traces 210 on a first side of the flexible PCB 164 to be interconnected with traces on the opposite side. Additional traces 214 can be provided to create regions of capacitive and/or inductive coupling, and in order to provide compensation networks to address crosstalk and the like. Alternatively, discrete components such as capacitors and inductors (not shown) can be attached to the surface of the flexible PCB 164, for example through the use of solder or the like. Referring to FIG. 11C in addition to FIGS. 10A and 10B, in an illustrative embodiment of a compensation scheme, the additional traces 214' are arranged to form compensating capacitances Cc which compensate for parasitic capacitances $C_P$ (and their coupling) introduced by the contact pads 170 and the contact surfaces 178.

Still referring to FIGS. 11A and 11B The tines 20 and the contact pads 172 are typically plated with a durable non-oxidizing conductive material such as gold (not shown) in order to improve signal transmission. A plurality of slots 192 are provided between each of the tines 20 such that the tines 20 may flex independently.

Figure 12:
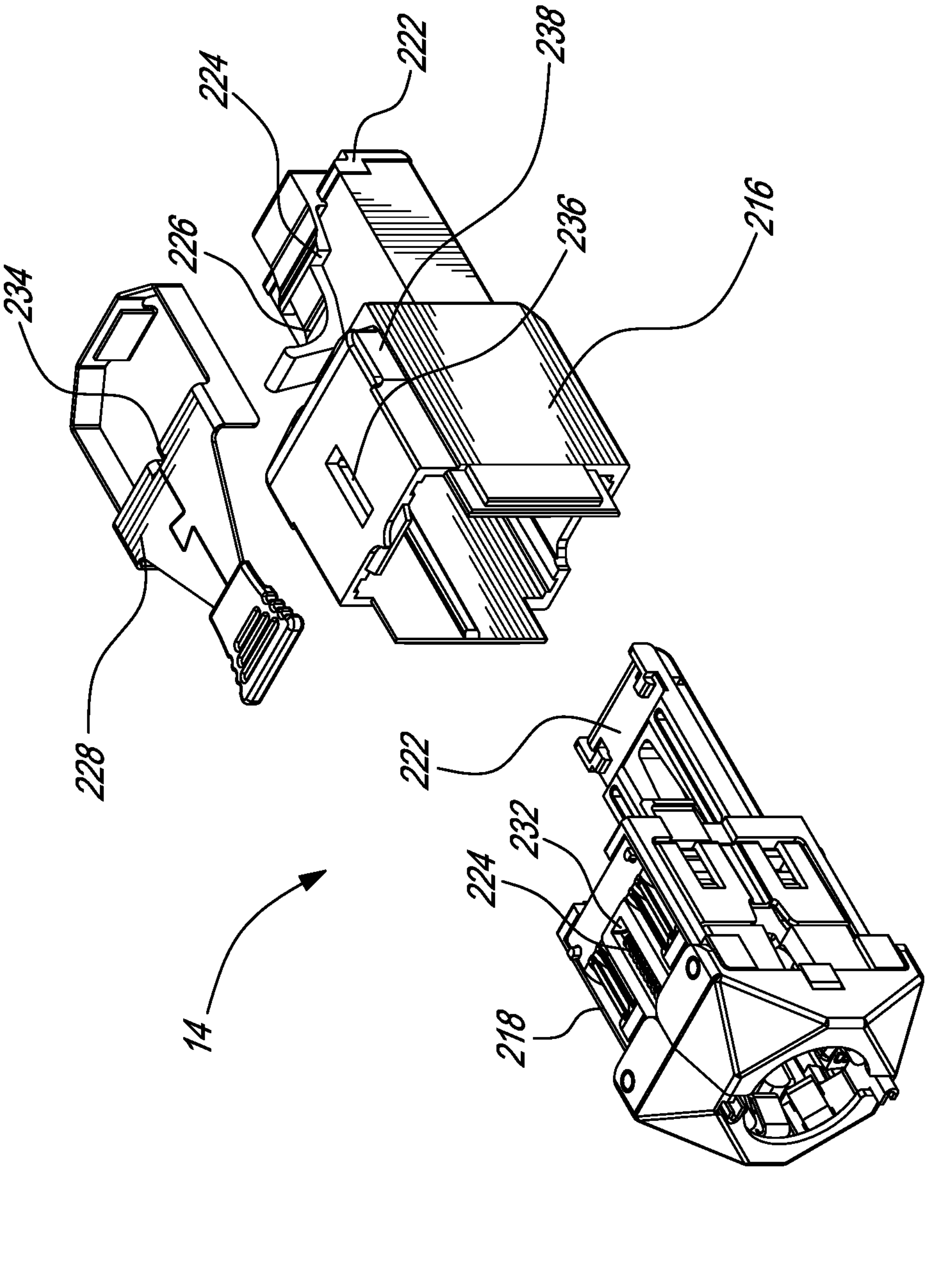
FIG. 12 provides an exploded isometric view of a plug in accordance with a second alternative illustrative embodiment of the present invention.
Figure 13:
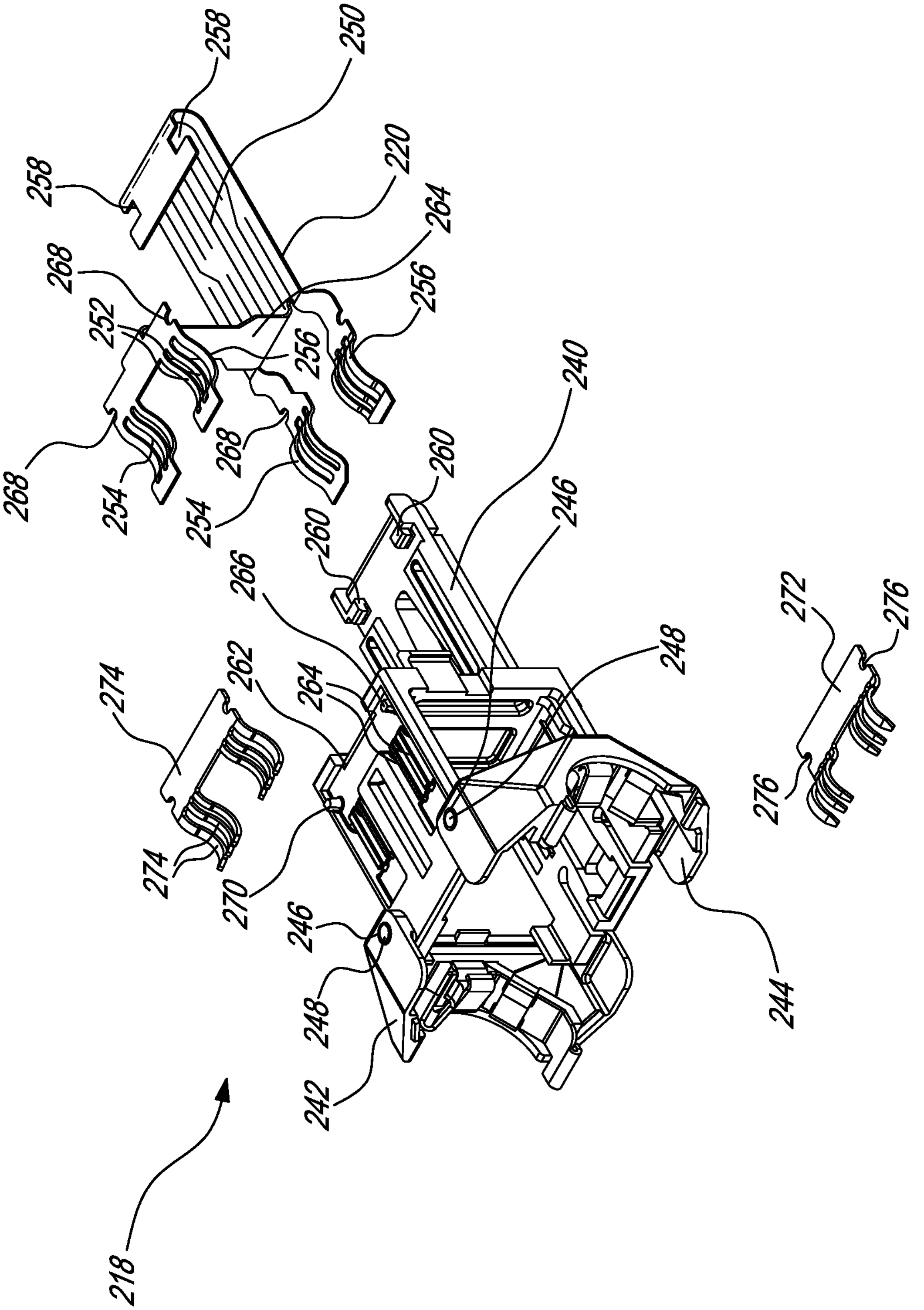
FIG. 13 provides an exploded isometric view of an interconnection assembly for a plug and in accordance with a second alternative illustrative embodiment of the present invention.

Referring now to FIGS. 12 and 13, the plug 14 in a second alternative illustrative embodiment of the present invention comprises a housing 216 which receives an interconnection assembly 218 comprising a plurality of terminal contacts (not shown) on the surface of a flexible PCB 220. The front end 222 of the housing 216 is illustratively shaped fit an RJ-45 type receptacle (reference 12 in FIG. 1) and comprises a locking latch (reference 28 in FIG. 1) comprising a tab 224 for engaging complementary features on the receptacle for securing the plug 14 in the receptacle and a lever 226, which is provided for releasing the tab 224 from the receptacle and which may be actuated by retracting a handle 228. A spring 230 is provided in a channel 232 within interconnection assembly 218 which engages with a boss 234 in the handle 228 which extends through a slot 236 in the housing 216. The handle 228 is held to the housing 216 via a pair of opposed channels 230 and such that the handle 228 may be moved backwards and forwards relative to the front of the housing 216. When the interconnection assembly 218 is inserted into the housing 216, the terminal contacts are exposed along the front end 222 of the housing 216.

Still referring to FIG. 13, the interconnection assembly 218 comprises a support frame 240 about which the flexible PCB 220 is bent. The support frame 240 further comprises a pair of lockable doors 242, 244 Each door 242, 244 comprises a pair of opposed apertures 246 that engage pins 248 moulded or otherwise formed into the support and about which the doors 242, 244 may pivot. The flexible PCB 220 comprises a plurality of traces 250 that interconnect the terminal contacts (not shown) with respective contact surfaces 252. Slots 254 are provided between adjacent ones of the contact surfaces 252 such that they may flex independently. An additional flexible surface 256 is provided adjacent each pair of contact surfaces 252 which provides for increased mechanical strength and may be used, for example, for providing a ground path or the like. A pair of notches 258 is provided which engage with raised tabs 260 in the support 240 to stabilise the assembly. A wide channel 262 is provided on the support for receiving during assembly an intermediate part 264 of the flexible PCB 220. Additionally, parallel slots 266 are provided in the support 240 for receiving respective contact surfaces 252 and additional flexible surfaces 256 therein. Additional notches 268 in the flexible PCB 220 engage pins 270 moulded in the support 240. In order to retain and stabilise the flexible PCB 220 on the support 240, a pair of biasing plates 272 are provided each comprising a plurality of fingers 274. On installation, each of the fingers biases a respective one of the contact surfaces 252 towards its respective piercing contact (not shown) and such that contact is improved. Each biasing plate 272 comprises a pair of opposed notches 278 which engage the pins 270 moulded in the support 240.

Referring back to FIG. 1 in addition to FIGS. 12 and 13, when the interconnection assembly 216 is installed in the housing, each of the terminal contacts 22 is exposed along the front 220 of the plug 14 and such that when inserted into the receptacle, each of the terminal contacts 22 comes into contact with a respective one of the tines 20.

Figure 14A:
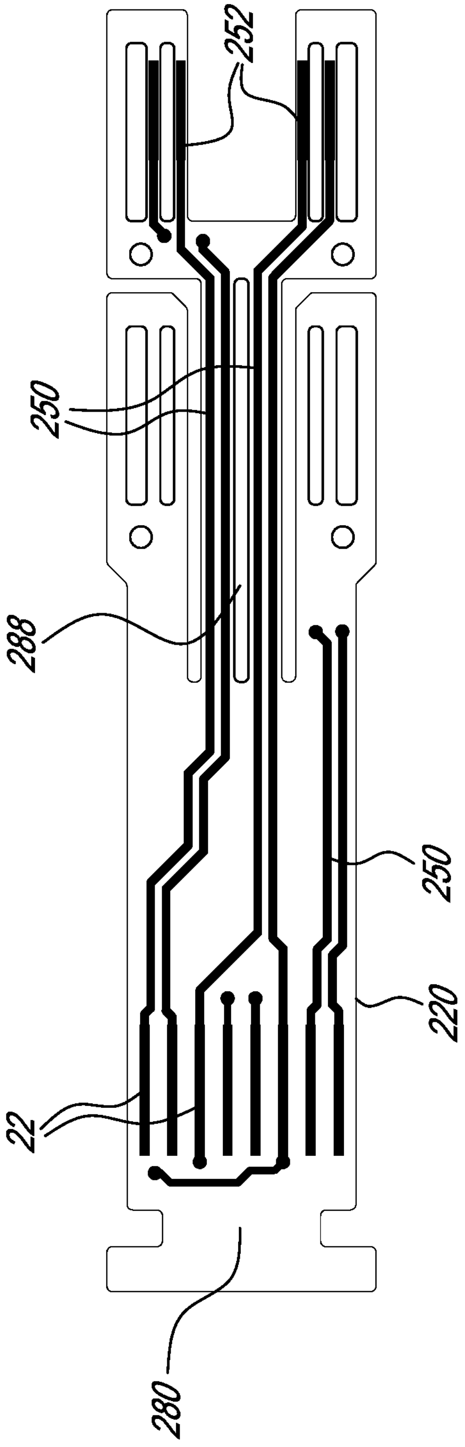
FIGS. 14A and 14B provide respectively top and bottom plan views of flexible PCB artwork for a plug in accordance with a second alternative illustrative embodiment of the present invention.
Figure 14B:
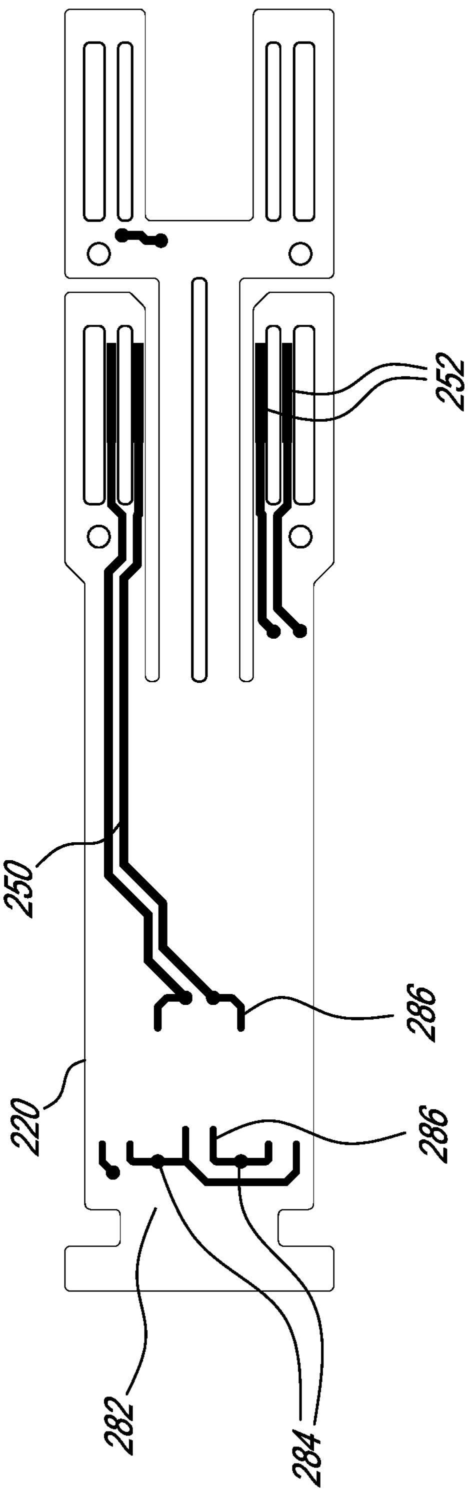

Referring now to FIGS. 14A and 14B, the flexible PCB 220 comprises a pair of opposed sides 280, 282 (outside, inside) of a single piece of dielectric material onto which the plurality of conductive traces 250 are etched or otherwise formed. The traces 250 interconnect each of the contact terminals 22 with respective ones of their contact surfaces 252. Vias 284 are provided to allow traces 250 on a first side 280 of the flexible PCB 220 to be interconnected with traces 250 on the opposite side 282 and vice versa. Additional traces 286 can be provided to create regions of capacitive and/or inductive coupling, and in order to provide compensation networks to address crosstalk and the like. Alternatively, discrete components such as capacitors and inductors (not shown) can be attached to the surface of the flexible PCB 220, for example through the use of solder or the like. The contact terminals 22 and the contact pads 252 are typically plated with a durable non-oxidizing conductive material such as gold (not shown) in order to improve signal transmission. In a particular embodiment, additional elongate metallic strips (not shown) can be bonded to the flexible PCB 220 along respective contact terminals 22, for example to improve electrical contact with a respective one of the tines 20.

Still referring to FIGS. 14A and 14B, a slot 288 is provided between adjacent traces 250 in the intermediate section 264 of the flexible PCB 220 and such that the adjacent pairs of traces can be offset from one another, for example through appropriate bending or the like and such that the coupling between the adjacent pairs of traces is reduced.

Figure 15A:
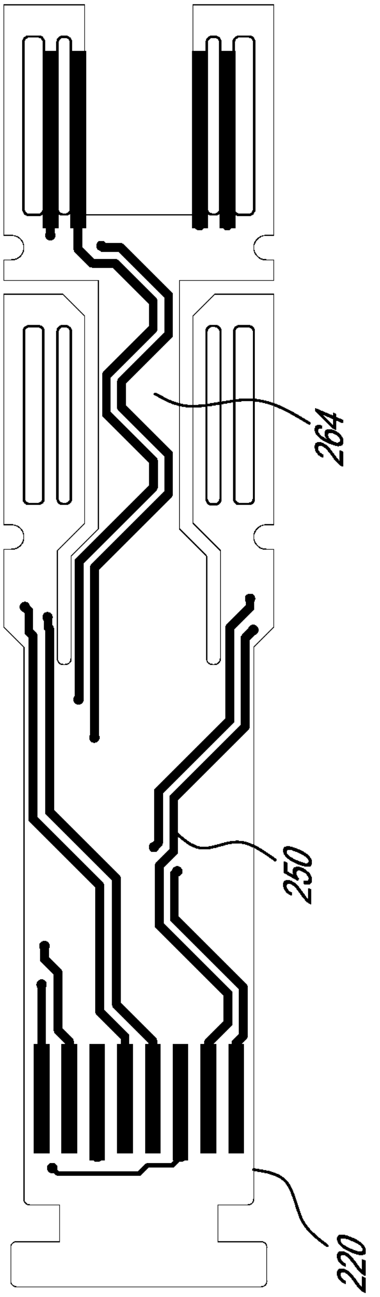
FIGS. 15A and 15B provide respectively top and bottom plan views of flexible PCB artwork for a plug in accordance with a third alternative illustrative embodiment of the present invention.
Figure 15B:
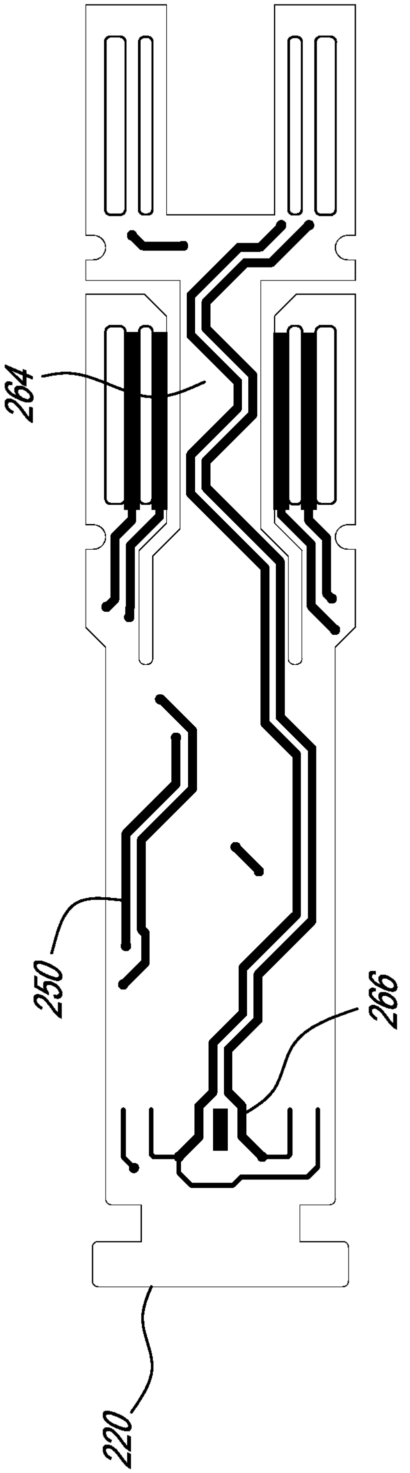

Referring now to FIGS. 15A and 15B, in a third alternative illustrative embodiment, the conductive traces 250 on the flexible PCB 220 for use with the plug 14, are located in the intermediate section 264 of the flexible PCB 220 cross one another to balance the transmission paths. Additional traces 286 are again provided to create regions of capacitive and/or inductive coupling, and in order to provide compensation networks to address crosstalk and the like.

Figure 16:
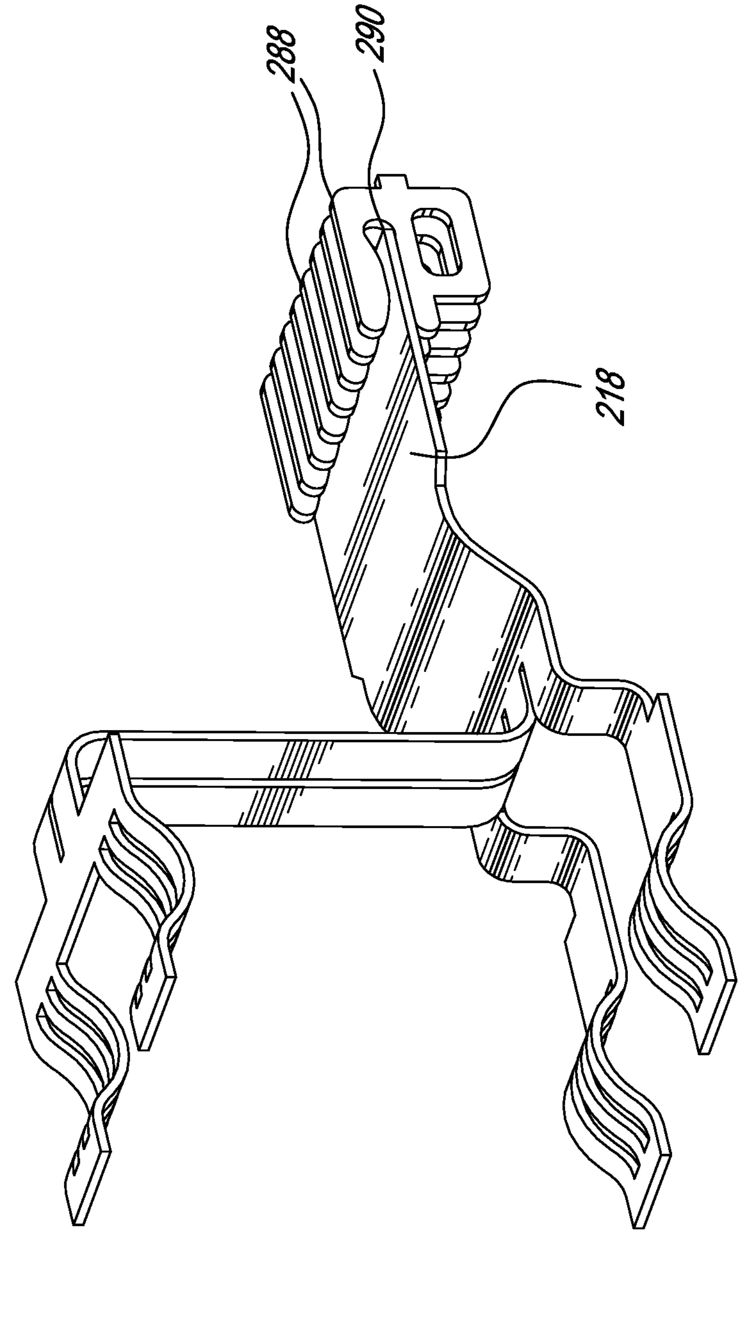
FIG. 16 provides an isometric view of flexible PCB and contact blades for a plug and in accordance with a fourth alternative embodiment of the present invention.

Referring now to FIG. 16, in a plug 16 according to a fourth alternative embodiment of the present invention, the flexible PCB 220 is terminated by a plurality of metallic blade terminal contacts 288 which engage traces arranged along a forward edge 290 of the flexible PCB 220.

Figure 17A:
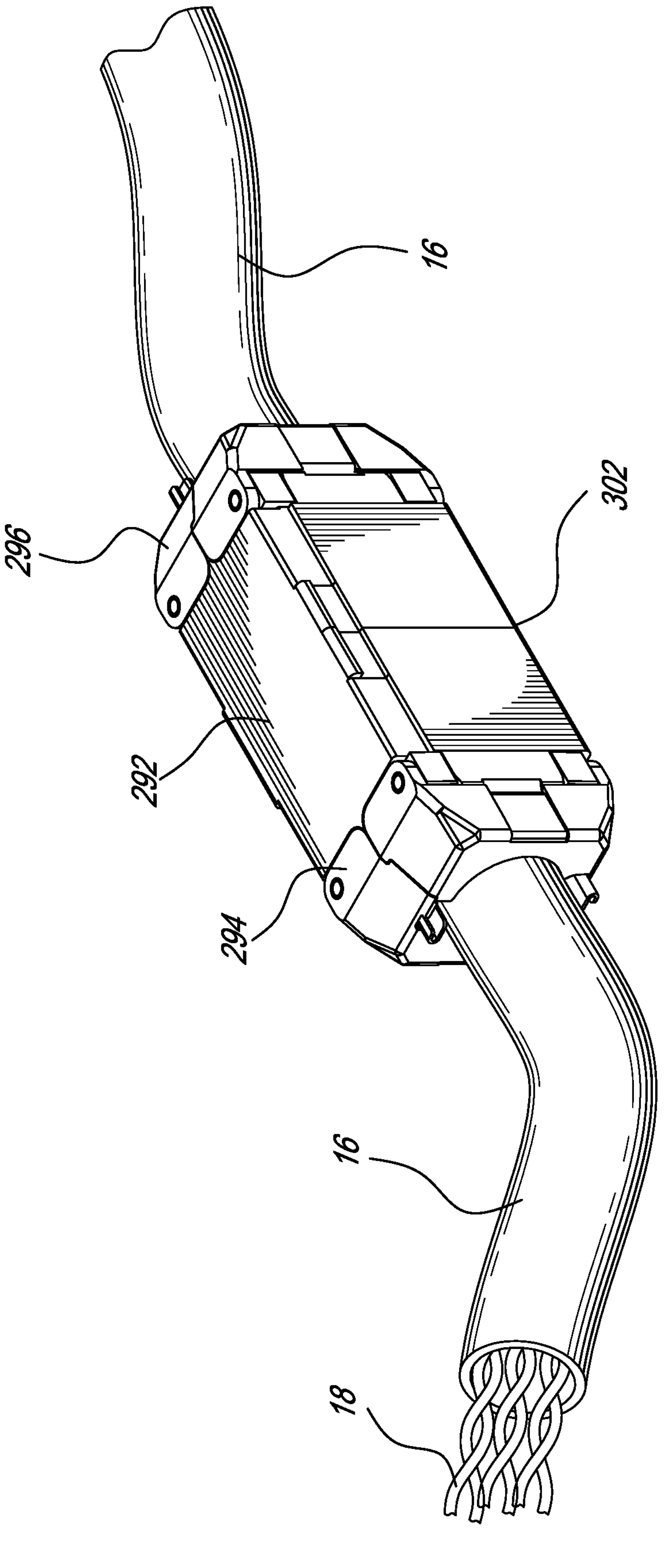
FIGS. 17A and 17B provide isometric views of a coupler and in accordance with a fifth alternative illustrative embodiment of the present invention.
Figure 17B:
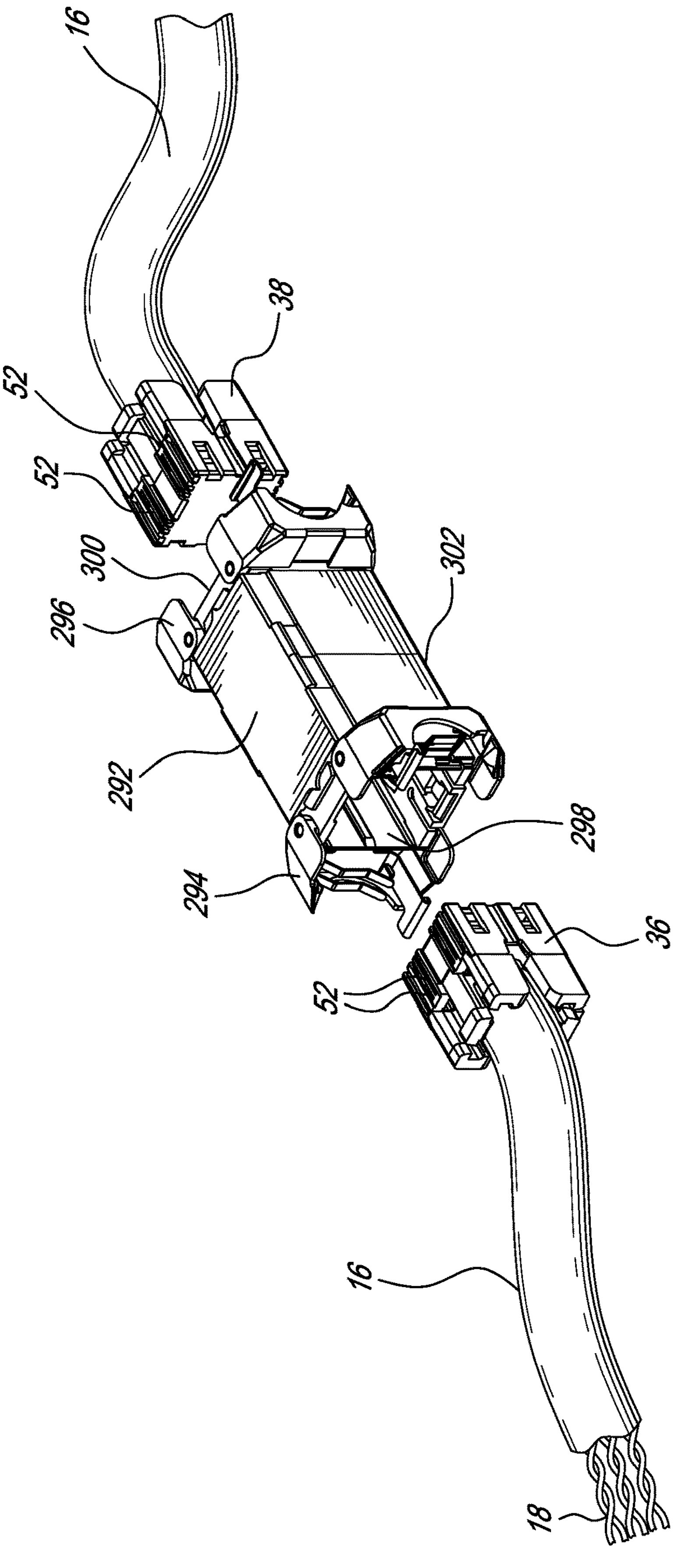

Referring now to FIGS. 17A and 17B, in a fifth alternative illustrative embodiment of the present invention, a connector 292 capable of terminating and coupling a pair of cables 16, each comprising a plurality of pairs of conductors 18. The connector 292 comprises a pair of opposed door sets 294, 296 which can be opened to allow for insertion or extraction of one of a pair of core assemblies 36 into their respective receptacles 298, 300 in the connector. The connector 292 further comprises a housing 302.

Figure 18:
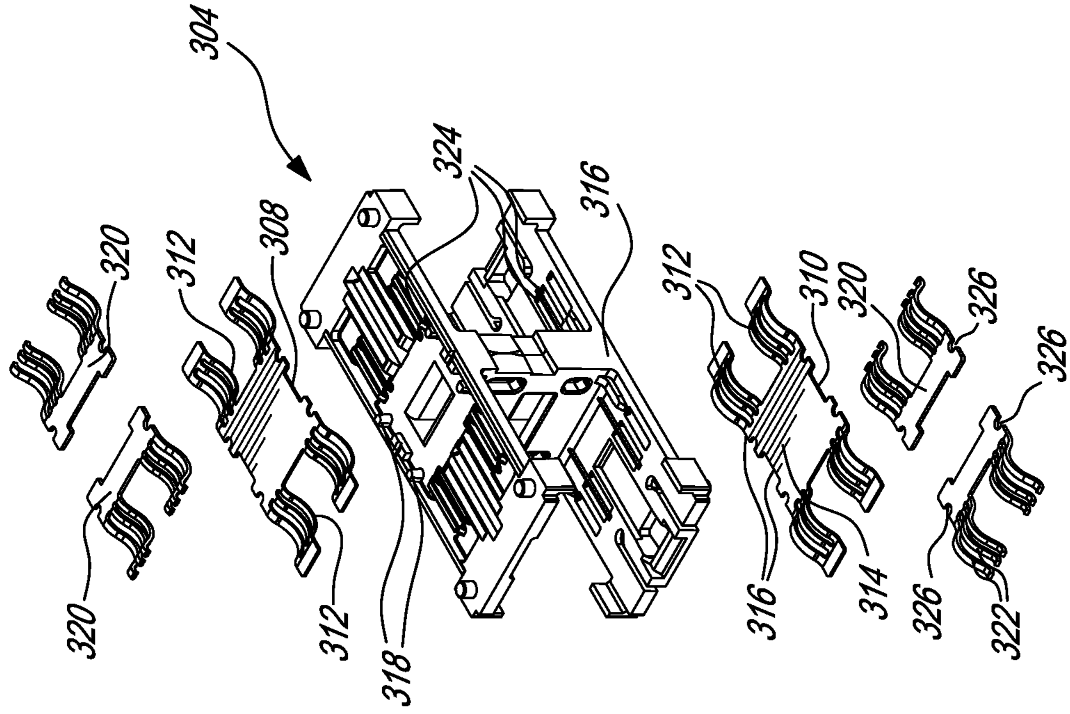
FIG. 18 provides an exploded isometric view of an interconnection assembly for a coupler and in accordance with a fifth alternative illustrative embodiment of the present invention.

Referring now to FIG. 18 in addition to FIG. 16B, an interconnection assembly 304 comprising a support 306 is housed within the housing 302. The interconnection assembly 304 further comprises a pair of opposed flexible PCBs 308, 310 each comprising a plurality of contact surfaces 312 which engage respective ones of the plurality of piercing contacts 52 exposed along an outer surfaces of the wire guides 38. Traces 314 are provided on each of the flexible PCBs 308, 310 for interconnecting respective ones of the contact surfaces 312 and such that when assembled conductors 18 of a first of the cables are interconnected with respective conductors 18 of the second of the cables 16.

Figure 19A:
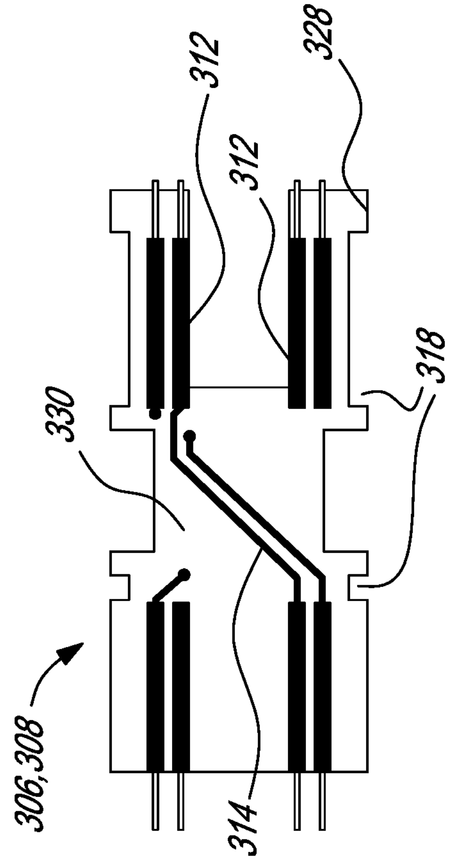
FIGS. 19A and 19B provide respectively top and bottom plan views of flexible PCB artwork for a coupler and in accordance with a fifth alternative illustrative embodiment of the present invention.
Figure 19B:
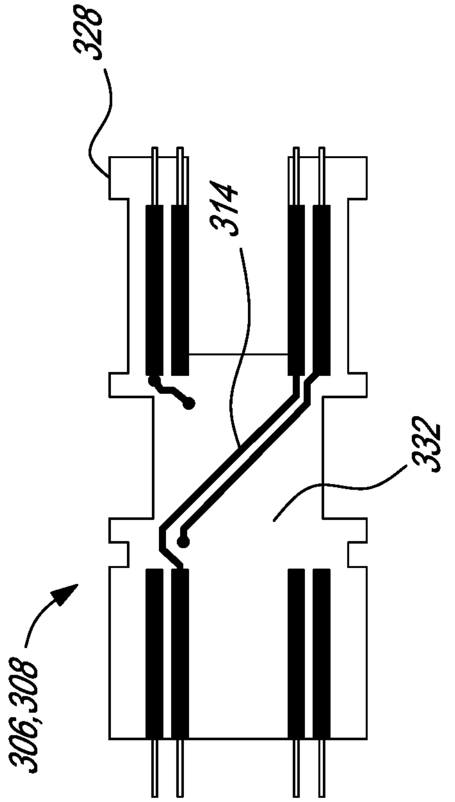

Referring to FIGS. 19A and 19B in addition to FIG. 17, the PCBs 308, 310 each comprise a plurality of notches 316 which engage with and are stabilised by bosses 318 on the support 306. In order to ensure good contact between the contact surfaces 312 and their respective piercing contacts 52 on assembly, a plurality of biasing plates 320 each comprising a plurality of fingers 322 are provided. The fingers 322 bias each of the contact surfaces 312 through a respective one of a plurality of slots 324 in the support 306. Each biasing plate 320 further comprises a pair of notches 326 which engage the bosses 318 thereby ensuring that the fingers 322 remain aligned with respect ones of their contact surfaces 312.

Still referring to FIGS. 19A and 19B each PCB 308, 310 comprises a dielectric substrate 328 comprising a top surface 330 and a bottom surface 332 and onto which, as discussed above, a plurality of traces 314 are etched or otherwise formed interconnecting pairs of contact surfaces 312. Vias 334 are also provided and such that a trace may continue from the top surface 330 to the bottom surface 332 and vice versa, thereby allowing the traces 314 to cross over one another and the like. In particular, the traces are arranged such that pairs of traces on the top surface 330 cross over traces 314 on the bottom surface 332 substantially at right angles.

Although the present invention has been described hereinabove by way of specific embodiments thereof, it can be modified, without departing from the spirit and nature of the subject invention as defined in the appended claims.

We claim:

1. An assembly for interconnecting a first cable comprising a first plurality of twisted pairs of conductors with a second cable comprising a second plurality of twisted pairs of conductors, each of the cables of a cabling category conforming to a cabling standard, the assembly comprising:

a first mating zone comprising a first plurality of pairs of contacts, each of the first pairs of contacts configured for connection with a respective pair of the first plurality of twisted pairs of conductors;

a second mating zone comprising a second plurality of pairs of contacts, each of the second pairs of contacts configured for connection with a respective pair of the second plurality of twisted pairs of conductors; and an intermediate transmission zone interconnecting each contact of the first pairs of contacts with a respective one of the second pairs of contacts;

wherein each of the first mating zone, second mating zone and the intermediate zone comprises an independent coupling network and such that NEXT introduced by a high frequency signal transmission between the first cable and the second cable in each of the first mating zone, the second mating zone and the intermediate zone is below a level as specified for the cabling category and the NEXT resulting from transmission of the high frequency signal between the first cable and the second cable is below a level as specified in the cabling standard.

2. The assembly of claim 1, wherein the first plurality of twisted pairs of conductors are terminated by a receptacle of the cabling category, the first mating zone comprises a plug connected with the receptacle and an elongate flexible printed circuit board (PCB) and wherein the first plurality of pairs of contacts comprise four pairs of like elongate terminal contacts arranged in parallel and side by side towards a first end of the PCB and exposed along a front face of the plug, each of the terminal contacts comprising a trace on the PCB, each of the terminal contacts adjacent and equidistant from at least one other adjacent terminal contact.

3. The assembly of claim 2, wherein the second mating zone comprises four pairs of conductor termination points towards a second end of the PCB, each of the second plurality of twisted pairs of conductors terminated at a respective pair of the termination points.

4. The assembly of claim 1, wherein the first plurality of twisted pairs of conductors are terminated by a plug of the cabling category, the first mating zone comprises a receptacle connected with the plug and an elongate flexible printed circuit board (PCB) and wherein the first plurality of pairs of contacts comprises eight like elongate contacting surfaces arranged in parallel and side by side towards a first end of the PCB, each of the contacting surfaces comprising a trace on the PCB, each of the contacting surfaces adjacent and equidistant from at least one other adjacent contacting surface, and an elongate slot between adjacent ones of the contacting surfaces.

5. The assembly of claim 4, wherein first and second outer pairs and a third center pair of the contacting surfaces each comprise a contact point at a first end thereof and a fourth inner pair of the contacting surfaces each comprise a contact point at a second end thereof, wherein a first contacting surface of the inner pair of contacting surfaces is arranged between the first outer pair and the center pair and a second contacting surface of the inner pair of contacting surfaces is arranged between the second outer pair and the center pair.

6. The assembly of claim 4, wherein the second mating zone comprises four pairs of conductor termination points towards a second end of the PCB, each of the second plurality of twisted pairs of conductors terminated at a respective pair of the termination points.

7. The assembly of claim 1, wherein the second mating zone further comprises a core assembly comprising a plurality of piercing contacts interconnecting respective ones of the four twisted pairs of conductors with respective ones of the second plurality of contacts.

8. The assembly of claim 7, wherein the core assembly comprises a wire guide comprising a plurality of channels for guiding respective pairs of the twisted pairs of conductors and a cap comprising a plurality of slots each arranged adjacent respective ones of the conductors and further wherein each of the piercing contacts are positioned in respective ones of the slots and such that a portion of each of the piercing contacts is exposed on an outer surface of the cap.

9. The assembly of claim 1, wherein the first mating zone further comprises a core assembly comprising a plurality of piercing contacts interconnecting respective ones of the four twisted pairs of conductors with respective ones of the second plurality of contacts.

10. The assembly of claim 9, wherein the core assembly comprises a wire guide comprising a plurality of channels for guiding respective pairs of the twisted pairs of conductors and a cap comprising a plurality of slots each arranged adjacent respective ones of the conductors and further wherein each of the piercing contacts are positioned in respective ones of the slots and such that a portion of each of the piercing contacts is exposed on an outer surface of the cap.

* * * * *